US008069131B1

(12) United States Patent
Luechtefeld et al.

(10) Patent No.: US 8,069,131 B1
(45) Date of Patent: Nov. 29, 2011

(54) METHOD, ARTIFICIALLY INTELLIGENT SYSTEM AND NETWORKED COMPLEX FOR FACILITATING GROUP INTERACTIONS

(76) Inventors: Ray Anthony Luechtefeld, Vichy, MO (US); Daniel Remy Tauritz, Salem, MO (US)

( * ) Notice: Subject to any disclaimer, the term of this patent is extended or adjusted under 35 U.S.C. 154(b) by 0 days.

(21) Appl. No.: 12/848,307

(22) Filed: Aug. 2, 2010

Related U.S. Application Data

(63) Continuation-in-part of application No. 12/074,356, filed on Mar. 2, 2008, now Pat. No. 7,769,705, which is a continuation-in-part of application No. 10/850,723, filed on May 21, 2004, now abandoned.

(51) Int. Cl.
*G06N 5/02* (2006.01)
*G06F 17/20* (2006.01)

(52) U.S. Cl. .............. 706/47; 706/46; 706/50; 706/55

(58) Field of Classification Search .................. 706/47
See application file for complete search history.

(56) References Cited

U.S. PATENT DOCUMENTS

| | | | |
|---|---|---|---|
| 4,914,590 A | 4/1990 | Loatman et al. | |
| 5,722,418 A | 3/1998 | Bro | |
| 6,009,420 A | 12/1999 | Fagg, III et al. | |
| 6,270,456 B1 | 8/2001 | Iliff | |
| 6,292,830 B1 | 9/2001 | Taylor et al. | |
| 6,314,410 B1 | 11/2001 | Tackett et al. | |
| 6,363,301 B1 | 3/2002 | Tackett et al. | |
| 6,604,090 B1 | 8/2003 | Tackett et al. | |
| 6,629,087 B1 | 9/2003 | Benson et al. | |

OTHER PUBLICATIONS

Eliza, Classic Chatterbot developed by Joseph Weizenbaum, Description found at www.somonlaven.com.
Elizafe, Complex Chatterbot developed by Peter Millican, Description found at www.simonlaven.com.
Gurubot, Chatterbot developed by Jabberwocky, Access available at www.simonlaven.com.
Nicole, Teachable Chatterbot developed by Phil Howlett, Description found at www.simonlaven.com.
Esteem, Case-based Reasoning, Esteem Software Inc., 1660 S. Amphlett Blvd., San Mateo, CA 94402.
Calendar With Common Sense, Erik T. Mueller, Description found at http//Ics.www.media.mit.edu/people.
Lopez, et al., "Embedding Facilitation in Group Support Systems to Manage Distributed Group Behavior," Proceedings of the 35th Hawaii International Conference on System Sciences—2002.
Trice, et al., "Consensus Knowledge Acquisition," Massachusetts, Institute of Technology Artificial Intelligence Laboratory, A.I. Memo No. 1183, Dec. 1989.

*Primary Examiner* — Jeffrey A Gaffin
*Assistant Examiner* — Nathan Brown, Jr.
(74) *Attorney, Agent, or Firm* — Richard L. Marsh

(57) ABSTRACT

An artificially intelligent or rule-based system to assist teams or groups become more effective by improving the communication process between members of the team or group. The system helps members share information, negotiate more effectively and make better group decisions. The system is designed to allow users to generate new interventions and rule sets which are then vetted by all users of the system.

20 Claims, 8 Drawing Sheets

METHOD, ARTIFICIALLY INTELLIGENT SYSTEM AND NETWORKED COMPLEX FOR FACILITATING GROUP INTERACTIONS

RELATED APPLICATION DATA

This application is a continuation-in-part of Applicant's application Serial No. 12/074,356, filed on 2 Mar. 2008 and issued as U.S. Pat. No. 7,769,705 on 3 Aug. 2010 which is a continuation-in-part application of Applicant's application Ser. No. 10/850,723 filed on 21 May 2004, now abandoned.

BACKGROUND OF THE INVENTION

1. Field of the Invention

This invention relates to a computerized, networked complex using an expert or rule-based or other artificially intelligent system (e.g., artificial neural network, genetic algorithm, etc.) to help teams or groups become more effective by improving communications between members of the team. The system employs skills generally known to and used by human facilitators/interventionists.

2. Prior Art Statement

Businesses, corporations, governments, non-governmental agencies, non-profits and sundry organizations are hierarchical in nature and thus each has a certain culture. Stephen P. Robbins, "Management", Third Edition, 1991, Prentice Hall, Englewood Cliffs, N.J. 07632 defines culture as a shared meaning of the values, symbols, rituals, myths and practice that have evolved over time within an organization. It is a perception of the organization not from one individual's perspective but every entity that observes the organization. To quote Robbins from page 71, "(J)ust as tribal cultures have totems and taboos that dictate how each member will act toward fellow members and outsiders, organizations have cultures that govern how members should behave. The culture conveys assumptions and norms governing values, activities and goals. In doing so, it tells employees how things should be done and what's important." Most individuals conform generally to the organization's culture however, individuals also carry with them their own characteristics. Therefore, an individual's behavior comprises that individual's attitudes, personality, perception, learning and motivation when acting independently, however, when acting within an organization, the individual's behavior may also comprise attitudes, perceptions, teachings and motivations of the organization.

Robbins states that there are at least three different, distinct types of groups. Command groups are determined by a rigid organization chart and as such are hierarchal. Joined groups consist of members that have associated themselves with other members to advocate a common interest such as unions, to bond together for social interests, such as associations or that have a common affliction, addiction or malady and thus are seeking a treatment for that condition such as twelve step groups. Appointed groups consist of persons working together to complete a job task. Appointed groups, hereinafter, task specific teams, generally cross command relationships and often even organizations.

Though most organizations have attempted to improve decision making through the employment of task specific teams, those task specific teams carry the culture of the entity which influences the activities of the members of the team as well as the characteristics of each individual. Thus, in every team there is an organizational bias and a plurality of individual biases so it does not follow logically that a task specific team within an organization is comprised of the sum of the individuals within the team as the behavior of a group of individuals is different in the team environment than when the individuals are acting alone. Cross disciplinary teams may further carry competing cultures into the task specific team work activities as the various disciplines within an individual organization may have different cultures. Moving outwardly from individual organizations to inter disciplinary task specific teams, those members from the individual organizations who comprise a task specific team infuse into the inter disciplinary task specific team the cultures of the individual organizations further exacerbating proper decision making Accordingly, it is understandable that task specific teams go through several stages of group development. Robbins defines these stages as forming, storming, norming, performing and adjourning. In the forming stage, individuals deal with the uncertainty of the group's purpose, structure and leadership while the storming stage surfaces the competing cultures and competing individual behaviors. Fortunately, in the norming stage, the group solidifies and assimilates a common set of expectations whereupon the group can perform in the performing stage to complete the charge given the task specific team. The adjourning stage disbands the group after task completion.

Luechtefeld, et al., in "Expert System for Team Facilitation Using Observational Learning," $37^{TH}$ ASEE/IEEE Frontiers in Education Conference, Oct. 10-13, 2007, Milwaukee, Wis., Session 1530, state that "(H)istory attests to the catastrophic consequences of team dysfunctions and neglect of group dynamics. For example, the space shuttle Challenger and Columbia tragedies can be attributed to failures in team skills. The Columbia Accident Investigation Board found that 'the hole in the wing of the shuttle was produced not simply by debris, but by holes in organizational decision-making Furthermore, the factors that produce the holes in organizational decision-making are not unique to today's NASA or limited to the shuttle program, but are generic vulnerabilities that have contributed to other failures and tragedies across other complex industrial settings'. Such conflicts and team dysfunctions are related to difficulties of team members sharing their perspectives and making tradeoffs. Since engineering teams are often multi-disciplinary, the complex set of problems that engineers face need to combine the expertise of different disciplines. Also, to make the project successful they need to collaborate with others in a team who may have different perspectives and technical objectives. The quality of decision-making in these contexts is enhanced by increasing openness and interdependence, and diminished when team members regulate or ignore certain information. While engineering institutions regularly give students projects involving technical knowledge, all too often students are put in project teams where they are expected to work together successfully without sufficient support in interpersonal and team skills Mere placement in teams does not guarantee the learning of these skills"

Contrasting task specific teams from other collections of individuals, i.e., joined groups such as twelve step groups, a task specific team is generally charged with a non-programmed decision making process to benefit the organization rather than the series of programmed steps to benefit an individual. Programmed decision making processes for modification of individual behaviors is characteristic of twelve step groups and therefore the steps toward behavior modification have been well established. In non-programmed decision making, the task specific team has an identified goal so the task specific team preferably gathers information from a variety of sources, identifies a plurality of alternative actions, assesses the probability of success of each of the alternative actions, including synergistic outcomes and the value of each alternative action toward the identified goal and bases the team decision upon the alternative having the greatest value toward the identified goal. Gregory Moorhead and Ricky W. Griffin, authors of "Organizational Behavior", 1995, Houghton Mifflin Co., 222 Berkeley Street, Boston, Mass. 02116, set forth characteristics of programmed and non-programmed decisions which lists the programmed decision characteristics as well structured, repetitive, routine with clear, specific instructions, readily available information, solutions based upon established rules with minor consequences for the organization. In contrast, non-programmed decision characteristics are poorly structured, the frequency is new and unusual, the goals are vague, the information is not available or must be developed, involve problem solving skills, judgement and where major consequences are likely for the organization. Accordingly, a great deal of uncertainty surrounds the non-programmed decision making process and the associated risks are immense. Various attempts have been made to assist individuals with improving individual skills, personal communications, personal memory aids, decision trees, feedback loops, writing aids, personal weight loss, individual mental acuity, overcoming addictions though all these attempts are geared to individuals, whether acting alone or in as a individual in a self-help group, not teams charged with a specific vexing problem.

On the other hand, group facilitation is a process in which an entity, usually a person, acceptable to all members of the group, is substantively neutral and has no decision—making authority intervenes to help a group improve the way it identifies and solves problems and makes decisions in order to increase the group's effectiveness. Preferably, the entity employs teachings from the field of organizational behavior, particularly, teachings from various studies of group dynamics or team dynamics. Interventions in team proceedings to foster decision making may employ rules based on the work of Argyris, et al., from the book entitled "Action Science: Concepts, Methods, and Skills for Research and Intervention," Chapter 8, Jossey-Bass, San Francisco, 1985.

Artificially intelligent systems exist for entertainment and self-help. These artificial intelligent systems are virtual robots commonly known as chatterbots or chatbots. Chatbots usually interact with a single individual through an Internet portal and the chatterbot uses statements made by the individual during the communication with the chatterbot to generate additional questions or statements. Thus, it is known to provide a virtual robot that focuses on analyzing what is communicated and returning statements or questions to continue the conversation. This is akin to the "Active Listening" programs used widely by motivational and self help groups. For instance, see the "chatterbots" Eliza, Elizabeth, Gurubot and Nicole available on the Internet. However, these chatterbots generally only interact with a single individual at a time and do not embody the knowledge of an expert facilitator/interventionist. Therefore, no facilitation of the exchange of information, no method of questioning a direction for a conversation between two or more people is provided, nor is there a focus on definitive declarations, negative statements, comparative words, phrases and patterns of speech.

Expert systems are known that provide information to the patient and/or to assist medical personnel in diagnosing a medical condition. The systems are highly context specific keying on input of patient symptoms and follow a decision tree model that embodies knowledge from experts in the medical field. A typical instance is the U.S. Pat. No. 6,270,456 B1 issued on Aug. 7, 2001 to Edwin C. Iliff, though many others have been granted to Iliff and other inventors. Thus, these expert systems have an ending point at the end of one of the branches of the decision tree and return only a single output for a single user. In addition to the above limitations there is also no means to further communications between individuals or members of teams, separate teams or teams in disparate locations.

It is further known to provide changeable scripts, a back-end feedback loop, a supervisor and an editor for identifying and testing the context of an input from a user and interacting with the user. The latter two may be human, but need not be so. The scripts may be written by users, programmers or automated learning programs. There are multiple categories, scripts, user records, robot objectives and local variables. Each script contains information about a particular subject and therefore the system "knows something" about that subject. The system also maintains a list of active subjects that are the current focus of the conversation so each may be accessed throughout the conversation, however, it appears that the user must initiate any change in subject, or ask the same question multiple times to sequence through the hierarchy of subjects, as the program returns a negative response when the questioning word does not fit with the last subject discussed. For instance, see U.S. Pat. Nos. 6,314,410B1, 6,363,301B1, 6,604,090B1 issued Tackett, et al., on Nov. 6, 2001, Mar. 26, 2002 and Aug. 5, 2003 respectively and the U.S. Pat. No. 6,629,087B1 issued Sep. 30, 2003 to Benson, et al. The '301 patent contains back-end learning entered in a "Predictive Features Database" which is then used to generate Gerbil source code to respond to input questions and provide answers. The '090 patent brings in a "specificity" measure by looking for the number of unusual words used in a request. The '090 patent also brings in condition levels, matcher blocks and activator blocks to order the specificity measure according to the values assigned to the words. Finally, the '087 patent provides for creation of new topics that are then incorporated into the scripts compiled in the runtime executive processor. Though these systems are designed to generate source code, create new topics and assign a specificity value to each generated question, source code generated by this method would return only one response and thus leave out alternative responses. Furthermore, Tackett, et al., and Benson, et al., do not appear to provide for monitoring interactive communication between multiple users on the same topic, or multiple topics, as would be the case in team conversations.

It is also known to provide a system for interactive preventative medical guidance and commercial goal management comprising a polling means for creating a database of personalized input data indicative of an individual's particular behavioral issue, an evaluation means, a mediation means, a program means and a feedback means. For instance, see the U.S. Pat. No. 5,722,418 issued on 3 Mar. 1998 to L. William Bro. The evaluation means and the mediation means are conducted by a human interventionist, usually a medical professional, and the feedback means is initiated by the human interventionist. The feed-back to the patient requires the technical skills of the human interventionist in the field, thus Bro is context based and the interventionist reacts to the context of the response and provides a context based intervention relative to the malady. Accordingly, each individual's behavior in a joined group would receive substantially the same predetermined response that all others in the joined group would receive in response to specific questions. Furthermore, the system of Bro is "closed ended," as each set of predetermined responses has an end, and action by the interventionist is required before a new set of predetermined responses can be started. Thus, Bro does not, and cannot, act autonomously, does not address a team, is skilled in the technical field of the issue and thus carries a certain bias toward that field, can only provide preprogrammed rules provided by a technical interventionist and does not act in real time therefore, even if utility for team decisions could be found in the teachings of Bro, the time required to reach consensus in a team environment would be excessive and costly. Thus, the need for an autonomous system, acting wholly independent of a human interventionist and thus avoiding the cost associated therewith, is needed to facilitate team decision making processes where characteristics are poorly structured, the problem is new and unusual, the goals are vague, the information is not available or must be developed. There is also a need for an autonomous system that is active as long as the participants are actively communicating, such as in an appointed team meeting. A further need exists for an autonomous system that does not rely upon the context of the discussion but rather upon particular words as triggers to provide instantaneous intervention to the patterns of interactions established by individuals of the group based upon teachings of organizational behavior housed in and automatically, instantaneously recoverable from a database.

Additionally, it is known to provide a system to help the user in exercising professional judgment in the course of authoring of a document by executing a question procedure that includes a reference to another procedure that takes into account an answer given by the user to another question, the procedure repeated until all questions material to the completion of the document are complete. For instance, see the U.S. Pat. No. 6,009,420 issued on Dec. 28, 1999 to Fagg, III, et al. No means to monitor conversation between members of a group is provided, nor is there any focus on particular words, phrases, definitive declarations, negative words or patterns of speech to enhance authoring of the document.

Software tools are available to assist individuals with constructing decision enabling applications using case-based reasoning. For instance, see the product ESTEEM from Esteem Software Inc., 1660 S. Amphlett Blvd., Suite 350, San Mateo, Calif. 94402. The software tool contains hybrid cases and rules, similarity assessment and learning through adaptation of prior experience, however, the software tool is limited to single individuals for single end uses and does not provide interactive intervention to multiple persons or receive input in multiple formats. Thus there is a great need for an intervention tool to help groups surface all information relevant to the subjects being discussed.

A calendar software tool is available to assist an individual to draw upon the individual's database of information regarding counterintuitive inputs to the calendar. Sensi-Cal, uses ThoughtTreasure a database embracing common sense knowledge and reasoning mechanisms. SensiCal is described in the article "A Calendar with Common Sense," by Erik T. Mueller in the Proceedings of the 2000 International Conference on Intelligent User Interfaces, pages 198-201 published in New York in Association for Computing Machinery. SensiCal interacts with a single user acting upon that user's inputs to the database returning responses based upon subsequent inputs to the calendar to remind of conflicts. The calendar cannot accommodate multiple users, does not perform in group interactions nor receive input from multiple input formats. Therefore, there is still a need for a networked complex for facilitating team proceedings comprising multiple user interfaces, multiple input and output devices, an operating system having at least one database containing a plurality of rules and an artificially intelligent system having means for monitoring patterns of interaction in an exchange of information to ferret out obstacles in proper decision making.

Also, it is known to provide a method of creating user-friendly architectural workspaces using agents that can be human, organizational, machine and/or electronic. The method is substantially "Orwellian" in nature, allowing control of agents by other agents, measuring the performance of agents, comparing the performance against an expected performance and modifying the agents based on the difference between actual and expected performance. In many places, the description includes feedback in the form of questions pertaining to the process undertaken and provides for suggesting alternative solutions or querying if an input solution fits a known model. The method is also context specific, comparing each entry with the system with the known architectural models. For instance, see the U.S. Pat. No. 6,292,830 B1 issued on Sep. 18, 2001 to Taylor, et al. Taylor, et al., does not however, monitor communications between individuals in order to make suggestions or return questions to improve the communications between the individuals. When all possible iterations have been considered, the process terminates resulting in a selection of only one developed workspace. It would appear then that multiple considerations would be denied. Limitations of the other prior art references are also applied to this patent.

Finally, it is known to provide a method of automated facilitation of group support systems to buttress facilitation efforts in managing behavior in the virtual environment. See for instance the article "Embedding Facilitation in Group Support Systems to Manage Distributed Group Behavior," Lopez, et al., Proceedings of the $35^{th}$ Hawaii International Conference on System Sciences—2002. Lopez, et al., provide for an intelligent agent to automate facilitator interactions for routine behaviors, however, when the ability of the intelligent agent is exceeded, a human facilitator is invoked. In Lopez, et al., the intelligent agent behavioral indicators act as the "eyes and ears" of the facilitator and "ThinkLets" are suggested to the facilitator, clearly indicating that the system is not continuously responding to the participants and that intervention by the facilitator is required. Thus, Lopez, et al., teach that the knowledge base is solely for the use of the facilitator, that is, a human interventionist, as the facilitator is key to the workings of that system. Accordingly, Lopez, et al., have an end point beyond which the intelligent agent lacks ability to intervene thus driving up costs for teamwork decision making Additionally, the interventionist of Lopez, et al., could be the team leader, another team member or a member of management which would introduce organizational bias into the team proceedings. The sum of the references indicates a need for an autonomous system, acting wholly independent of a human interventionist, to facilitate team decision making processes where characteristics are poorly structured, the problem is new and unusual, the goals are vague, the information is not available or must be developed. There is also a need for an autonomous system that is active as long as the participants are actively communicating, such as in an appointed team meeting yet benefitting from an automatic intelligent agent, thus avoiding the cost associated with an human interventionist. A further need exists for an autonomous system that does not rely upon the context of the discussion but rather provides instantaneous intervention to the patterns of interactions established by the individuals of the group based upon teachings of organizational behavior housed in and automatically, instantaneously recoverable from a database.

SUMMARY OF THE INVENTION

The prior art is replete with rule-based, case-based and model-based diagnostic systems each having an ending point in which only a single decision can be reached. Absent an human facilitator, the prior art does not contain any description of an expert, rule-based, or other artificially intelligence-based (e.g., artificial neural network, genetic algorithm, etc.) method for improving communications, especially communications between members of teams given a specific charter wherein the specific charter has an effect upon at least one process, product, apparatus, structure, organization or non-participant but likely has little effect upon members of the team. Additionally, the prior art depends upon the context of the subject at hand, not upon the communications itself as would be the case when teams consider a situation. Therefore, there is a great need for a computerized, networked complex using an artificially intelligent system to monitor communications and act as a facilitator. The uses are varied. For instance, in Homeland Defense meetings where access needs to be limited, the use of the method, artificially intelligent system and networked complex of this invention eliminates the need for a trained interventionist/facilitator so that classified or confidential information may readily be protected while group knowledge sharing and decision making is enhanced. In business strategy meetings, the method, artificially intelligent system and networked complex of this invention provides the opportunity for a low-cost interventionist in a setting where confidential information may be discussed. Product development or design meetings will benefit from the use of the low-cost facilitation provided by this invention that will help developers and marketers share information and understand divergent perspectives much more effectively. The method, artificially intelligent system and networked complex of this invention may also be used to advantage to help emergency response coordinators understand competing needs by providing easily transportable team facilitation expertise. Understandably, emergency response personnel perform in conditions where facilitation is unnecessary or unworkable because response coordinators have perfected methods of trauma treatment, possibly employing the teachings of this method. Thus, though the artificially intelligent system of this invention is unconstrained by organizational bias during its operation, entities wishing to employ the system may provide an external bias toward using same because of the environment faced by the entity. The method, networked complex and artificially intelligent system of this invention may also be incorporated into existing battlefield or mission control communications systems and used to flag potential misunderstandings in the communications, however, it should be fully understood that in the heat of battle, a command structure performs best according to preexisting programmed steps. Likewise, the method, networked complex and artificially intelligent system of this invention may be used to help police investigators follow every path in an investigation and to discover alternate paths. Other uses of the method, artificially intelligent system and networked complex of this invention should be apparent such as legal strategies, jury deliberations, cause and effect analysis, scientific research, conflict resolution, peacemaking, negotiations and examination preparation as the artificially intelligent system is conversant only in words related to intervention as established from theories and practices from organizational development, organizational behavior and group facilitation. Since the artificially intelligent system is only conversant in words related to intervention, the artificially intelligent system is usable in multiple environments without being constrained by the language of the conversation being facilitated. Furthermore, as set forth above, though the artificially intelligent system is not constrained by either the language of the conversation nor the organization employing the artificially intelligent system, external bias toward employment of the system may exist because of the situation. Additionally, since the artificially intelligent system follows rules from organizational development, organizational behavior and group facilitation, the artificially intelligent system cannot have organizational bias contained therein as organizational bias would be contrary to the rules followed by the system.

Thus, it is an object of this invention to provide a computerized, networked complex using an artificially intelligent system that can receive communication in multiple formats and act as a facilitator to a team or group of two or more members by monitoring the communications between members of the team or group. The artificially intelligent system then generates suggested questions or statements that members of the team or group may consider and incorporate into their subsequent communications whether the communications are between the team and other individuals or other teams.

It is another object of this invention to provide a computerized, networked complex that comprises any kind of expert, rule-based, or other artificially intelligent system (e.g., artificial neural network, genetic algorithm, etc.) that monitors interactions occurring between individuals and/or groups and generates statements and/or questions based on theories and practices from organizational development, organizational behavior, or group intervention/facilitation designed to improve those communications.

Still another object of this invention is to provide a system that is useful in surfacing and sharing information while communicating in a chat room via the Internet, in verbal communication in face-to-face meetings, in written e-mail communication, in verbal communication using a telephone, voice over internet technology, wireless device, in conversion of handwritten text from an electronic tablet or a combination of the above.

Yet another object of this invention is to provide a system that provides the first conceptualization and demonstration that knowledge from the fields of organizational behavior, organization, development or team facilitation/intervention can be embodied in a virtual robot of a computing system. Thus, the knowledge embodied in the system is of great importance.

A goal of this invention is to provide an artificially intelligent system that considers terms of communications that indicates the possibility that information was deleted and generates questions to help individuals surface that information and share it with others.

A principal object of this invention is to provide computerized, networked complex that will monitor patterns of communication that can be used by the virtual robot/artificially intelligent system of the computing system to generate statements and/or questions to maintain trust between members. For example, the system recognizes the pattern often used by persons in authority where that person thinks another has made a mistake but does not want to say so directly.

Another aim of this invention is to provide a computerized, networked complex using an artificially intelligent system that can also implement many other patterns of interactions or indicators as triggers for intervention, including those indicative of groupthink, such as the absence of disagreement or lengthy silence from one or more participants, the "risky shift" phenomena (group polarization toward excessive risk), domination by one or a few members of the team/group and statements relating to unfavorable beliefs or attributions about others. Other triggers for intervention can include facial expressions or body language (monitored by a camera whose images are analyzed by the artificially intelligent system).

Thus, it is within the scope of this invention to incorporate various potential patterns of interactions or indicators and trigger responses to those patterns or indicators using the computer-based system.

A goal of this invention is to provide a computerized, networked complex using an artificially intelligent system that can also provide other types of intervention and assistance with group process based on research in organizational behavior and team dynamics, including, for example, reminding members of a group to prepare a "to-do" list for a meeting and to assign responsibilities for completion of tasks.

It is another object of this invention to provide a computerized, networked complex that comprises:
1) a component to monitor communications comprising a microphone coupled with voice recognition software and software to monitor text streaming between parties,
2) a component to evaluate the communications using text base rules, neural network, genetic algorithms or other form of artificial intelligence,
3) a component to suggest statements or questions to the participants in the communication using an artificial voice, a video display of written text or text in a chat room window wherein the system will enact the following processes:
a) scan the incoming stream of communication,
b) identify triggers for statements/inquiries to intervene in, clarify or facilitate the communication,
c) make the statements/inquires available to the participants in the communication.

One intention of this invention is to implement an artificially intelligent system that uses inquiries to assist individuals communicating in an electronic chat room share information more effectively. This implementation is based on cognitive theories that suggest when people speak or write they leave out certain information. This missing information would better illustrate the communicator's reasoning thus opening it up to question. The artificially intelligent system would monitor the stream of conversation exchange between the individuals in the chat room and look for certain phrases or keywords. The phrases or keywords are then used to trigger inquiries.

It is another object of this invention to provide a means for monitoring communications that has no ending point thus permitting all threads of a conversation to be completely explored.

An objective of this invention is to simultaneously monitor communications between multiple individuals considering multiple situations.

A purpose of this invention is to facilitate cognitive thought.

Another goal of this invention is to reduce the cost of team functions by improving communications between team members without the use of trained facilitators.

One design of this invention is to improve the security of information exchanged between team members.

An aim of this invention is to increase the availability of intervention practice thus facilitating team function in virtually any location at virtually any time.

Yet another purpose of this invention is to spur research in new approaches to improving human interaction by artificially intelligent agents.

Other objects and intentions of this invention will become readily apparent throughout the reading of the detailed description that follows.

DESCRIPTION OF THE PREFERRED EMBODIMENTS

Figure 1:
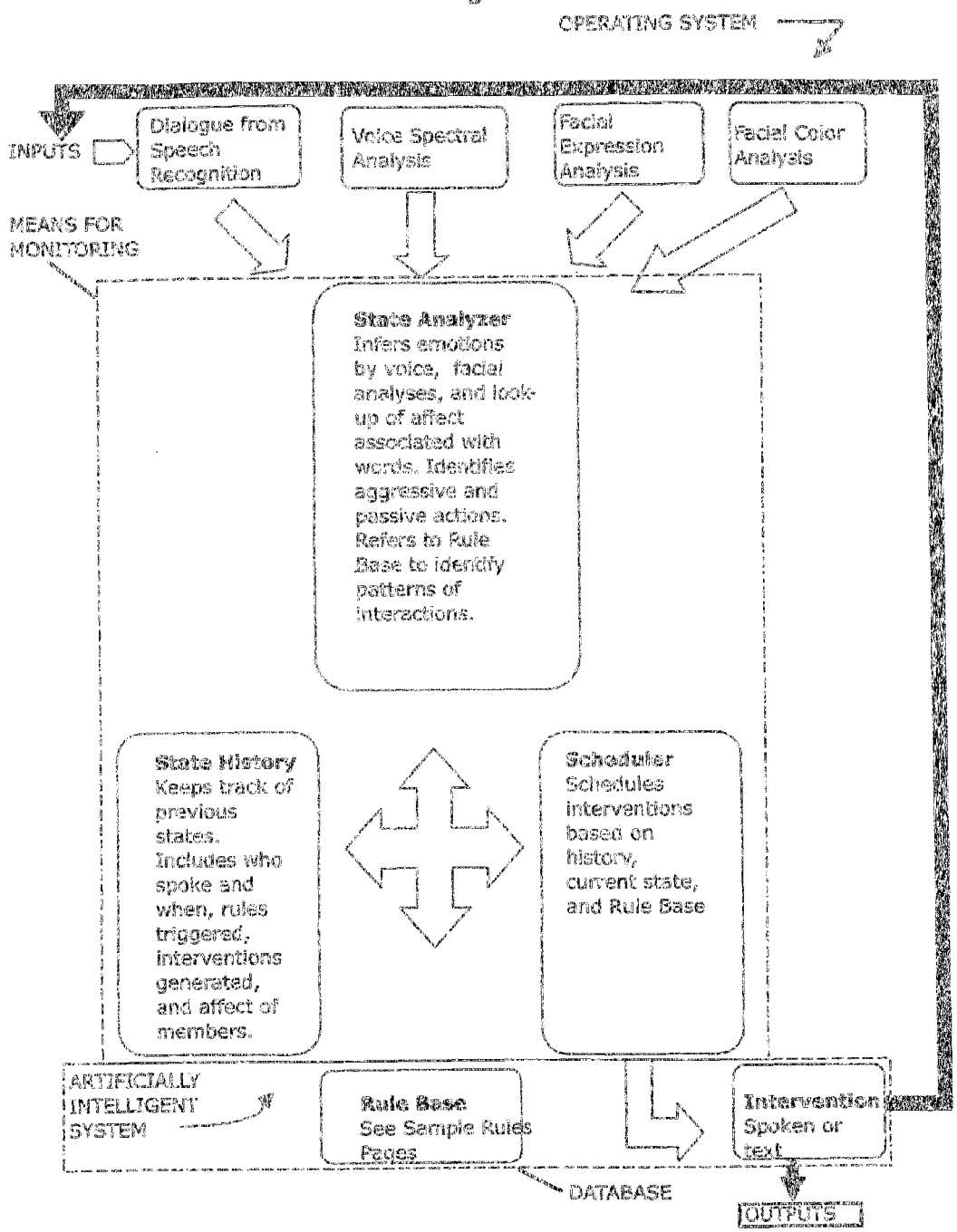
FIG. 1 is a block diagram of the preferred embodiment of the operating system for the networked complex for facilitating group interactions described in this invention.

While the various features of this invention are hereinafter described and illustrated as a method and computerized, networked complex employing an expert, rule-based, or other artificially intelligence-based (e.g., artificial neural network, genetic algorithm, etc.) system for facilitating team proceedings wherein the artificially intelligent system monitors patterns of interaction in the exchange of information between team members to ferret out obstacles in proper decision-making, the artificially intelligent system triggering statements of intervention based upon certain of the patterns of interaction, it is to be understood that the various features of this invention can be used singly or in various combinations thereof as can hereinafter be appreciated from a reading of the following description.

The method of this invention acts as a facilitator to a team or group of two or more members by monitoring the interactions between members of the team or group and generating suggested questions or statements that members of the team or group may consider and incorporate into their subsequent communications or communications between the team members and other individuals or teams. Trained facilitators or interventionists are expensive to hire, transport to the site required, and use for any extended period of time as these trained facilitators or interventionists generally charge by the hour, not including transportation. It should be readily apparent then, that the use of trained facilitators or interventionists is not required and therefore a reduction in cost can be realized when the computerized networked complex, artificially intelligent system and method of this invention are employed. Though every action undertaken by the group is not subject to the same scrutiny that would be present with the use of a human expert in the field of facilitation or intervention, the artificially intelligent system and method of this invention does provide a low-cost option where no such low-cost option previously existed. Secondly, security of information owned by the organization is greatly improved. Some organizations may not currently use trained facilitators or interventionists because of concerns about information security. For example, meetings of government bodies involved in homeland security may be particularly sensitive to the concern of security. The artificially intelligent system and method of this invention thus provides a measure of team process improvement without potential loss of classified information through a third party. Thirdly, the artificially intelligent system and method of this invention provides for increased availability of facilitation or intervention practice. Trained interventionists or facilitators are relatively rare and therefore the method and artificially intelligent system of this invention provides the opportunity for help with team function at virtually any location at any time. Finally, the method and artificially intelligent system of this invention spurs research into new approaches to improving human interaction. The method and Artificially Intelligent System of this invention preferably uses a web-based rule editor in virtual space that will allow users on the World Wide Web to develop rules for intervention that the Artificially Intelligent System may use when intervening in conversational processes. Users can specify words or phrases that will act as triggers for interventions as well as questions or phrases that the Artificially Intelligent System will deliver to group or team conversations when the rule is triggered. The method and Artificially Intelligent System will also consist of a system that enables the use of procedures for interventions to be developed by users on the World Wide Web thus taking full advantage of "crowdsourcing," a methodology employed by YouTube and Wikipedia. The procedures will consist of sets of rules entered into a rule editor that comprise a flow chart that will lead a group or team through a prescribed series of steps that will aid in resolving group difficulties. However, all new rules and interventions entered into the Artificially Intelligent System will be vetted by individual users and groups using the Artificially Intelligent System as explained hereinafter. Furthermore, since the Artificially Intelligent System lends itself to operation in the "cloud" rather than being managed by researchers on a resident computer, maintenance, accessibility and scalability are greatly improved while leaving the option open for a system to be run on a secured resident computer when there is a need for high security in, for example, classified domains. Furthermore, the Artificially Intelligent System functions autonomously as all interventions are vetted by the users reducing the burden on the system managers, increasing scalability and increasing the variety and usability of interventions. The artificially intelligent system and method of this invention provides a demonstration of the capabilities of artificially intelligent approaches to improving human interaction.

It has been shown that intervention in team meetings can enhance performance. Consistent with organizational and cognitive theories of behavior, persons in group settings selectively delete, distort, and/or generalize facts to minimize threats and promote personal goal attainment. The result is a reduction in the effectiveness of group problem solving activities during periods when it is particularly important that individuals be able to communicate their reactions and reasoning. In Applicant's unpublished doctoral dissertation titled MODEL II BEHAVIOR AND TEAM PERFORMANCE: AN EXPERIMENTAL DESIGN AND INTERTEXTUAL ANALYSIS presented in December 2002 at Boston College, The Carroll Graduate School of Management, Department of Organization Studies, the entire dissertation incorporated herein by this reference hereto, on page 48, Applicants state the design of the study was to test the effect of interventions designed to surface information on team performance. While the interventions tested as part of the dissertation research were human-generated, one implementation of this invention illustrates the ability of the application of a method, artificially intelligent system, and networked complex to produce equivalent interventions, with the expectation of correspondingly effective results.

The tables and analysis of the table data and certain statements from the dissertation appear below in quotations with other excerpts from the dissertation restated for clarity. "The exercise used in this research asked team members to play the role of members of a fictional company that was operating at a loss. The goal was for the team to determine how to make the company as profitable as possible by reducing expenses and increasing revenue. This was to be accomplished by layoffs, reducing salaries, and either reducing the development budget to save money or increasing it to earn more money. Each of the players had various constraints on the actions they could take built into their personal profile. A prize of $500 was offered to the team that was able to produce the greatest profit." In the exercise, teams were only allowed to communicate with one another electronically.

On page 51, the test hypothesis states that the performance of teams treated with interventions to surface information will be significantly higher than those not treated. The corresponding null hypothesis becomes: "The profitability of teams treated by interventions to assist in the surfacing of information is not significantly higher than teams with no treatment. Comparing the mean profitability between the two groups that received the treatment and the two groups that did not receive treatment will test this hypothesis."

"The teams participating in this study were divided into four groups; two that received the treatment and two groups that were not treated."

In the groups receiving treatment, the researcher served as an external facilitator who applied the treatment. Interventions into the groups' dialogue occurred as the teams worked on solving the business simulation in chatspace. The external facilitator followed the instructions for intervention known from the fields of Organization, Team Building and Organizational Behavior. "This group was called the 'Externally facilitated—treatment group.'"

"The teams in the other treatment group had a team member who was assigned the role of facilitator. This internal facilitator was given the same set of intervention instructions as the external facilitator and directed to intervene in the team's interactions by asking questions according to the instructions. This group was called the 'Internally facilitated—treatment group.'"

"The purpose of applying the interventions in two ways has to do with the potential for the Hawthorne effect. It is possible that a team's performance might be affected due to having an outside facilitator intervening. Comparing the differences between an external and internal treatment facilitator allows investigation of this concern. There is another important reason for including internal facilitation in the study. It would be generally expected that an expert facilitator brought into the group might be able to help a team improve its performance. But it is less likely that an internal, non-expert, facilitator who has only read several pages describing suggested interventions would be able to help a team improve its performance. If only reading a few pages describing treatments allow internal facilitators with no special training to significantly improve performance over a group that has received no treatment, this indicates that such treatments can provide an economical means to improve overall team performance. While it is not expected that allowing a team member to merely read a few pages of instructions can improve performance as much as an expert facilitator, the cost/benefit ratio may be much higher. Ten minutes of reading by a team member is far less costly than hiring an expert facilitator to sit in on a team meeting."

"Two groups did not receive treatment. The teams in one of these groups had a member of their team who was given the role of internal facilitator though this internal facilitator was given only general instructions for facilitating or intervening, such as '(I)f the group does not seem to be working together effectively, you might help them analyze what is going wrong.' This group allowed comparisons between the effects of an internal facilitator who was directed to administer specific treatments and an internal administer who was not directed to do so. It also allowed a check for any effects that might be due to having an internal facilitator, whether or not that facilitator delivered the treatment. This group was called the 'Internally facilitated—no treatment group.'"

"The other group that did not receive a treatment was composed of teams that had no facilitators at all and did not have the treatment formally applied. This group was called the 'Control group.' Table 3.1 summarizes the assignment of groups within this design."

TABLE 3.1

Experimental Groups Used

| Treatment | No Treatment |
|---|---|
| Internal facilitator | Internal facilitator |
| "Internally facilitated-treatment group" | "Internally facilitated-no treatment group" |
| External facilitator | No facilitator |
| "Externally facilitated-treatment group" | "Control group" |

"Hypotheses relating to predictions that one group will have significantly better performance than another are tested using t-tests. One-tailed rather than two-tailed t-tests are used. Two-tailed tests are appropriate for null hypotheses that the differences between means are zero, while one-tailed tests are appropriate for a null hypotheses that the mean of a specific group is not greater than the mean of another. The latter is the type of null hypotheses used in this research."

"The first hypothesis states that the teams treated with interventions to surface information will perform significantly better than those not treated ($p<0.05$). The summary of the results is found in Table 4.2. The mean profit for the treatment group is considerably higher than that of the no treatment group."

TABLE 4.2

Treatment vs. No Treatment Performance Comparison

| Group | Mean Profitability | Standard Deviation | N |
|---|---|---|---|
| No Treatment | −9157.1429 | 46921.756 | 42 |
| Treatment | 12305.8235 | 48189.0648 | 34 |

1054 "A one-tailed t-test was used to calculate the probability that the profitability of the treatment group was greater than that of the non-treatment group if the null hypothesis of no difference were true." Referring now to Table 4.3, the difference in means was significant. "Based on the analysis of these data, the null hypothesis was rejected. The findings support the hypothesis that the intervention was effective in improving team performance."

TABLE 4.3

Hypothesis 1 t-test, Treatment vs. No Treatment

| Variances | t-value | DF | 1-Tail Sig |
|---|---|---|---|
| Equal | 1.96 | 74 | 0.0269 |
| Unequal | 1.95 | 70 | 0.0274 |

"Other hypotheses have to do with specific predictions about the relationships between experimental groups. An overview of the performance of the various groups is presented in Table 4.4."

TABLE 4.4

Experimental Group Performance Overview

| Group | Count | Mean | Standard Deviation |
|---|---|---|---|
| Control | 26 | −$9,164 | $46,771 |
| Internal Facilitator-No Treatment | 16 | −$9,145 | $48,702 |
| External Facilitator-Treatment | 14 | $16,800 | $60,855 |
| Internal Facilitator-Treatment | 20 | $9,159 | $60,855 |
| Total | 76 | $444 | $48,381 |

Figure 2:
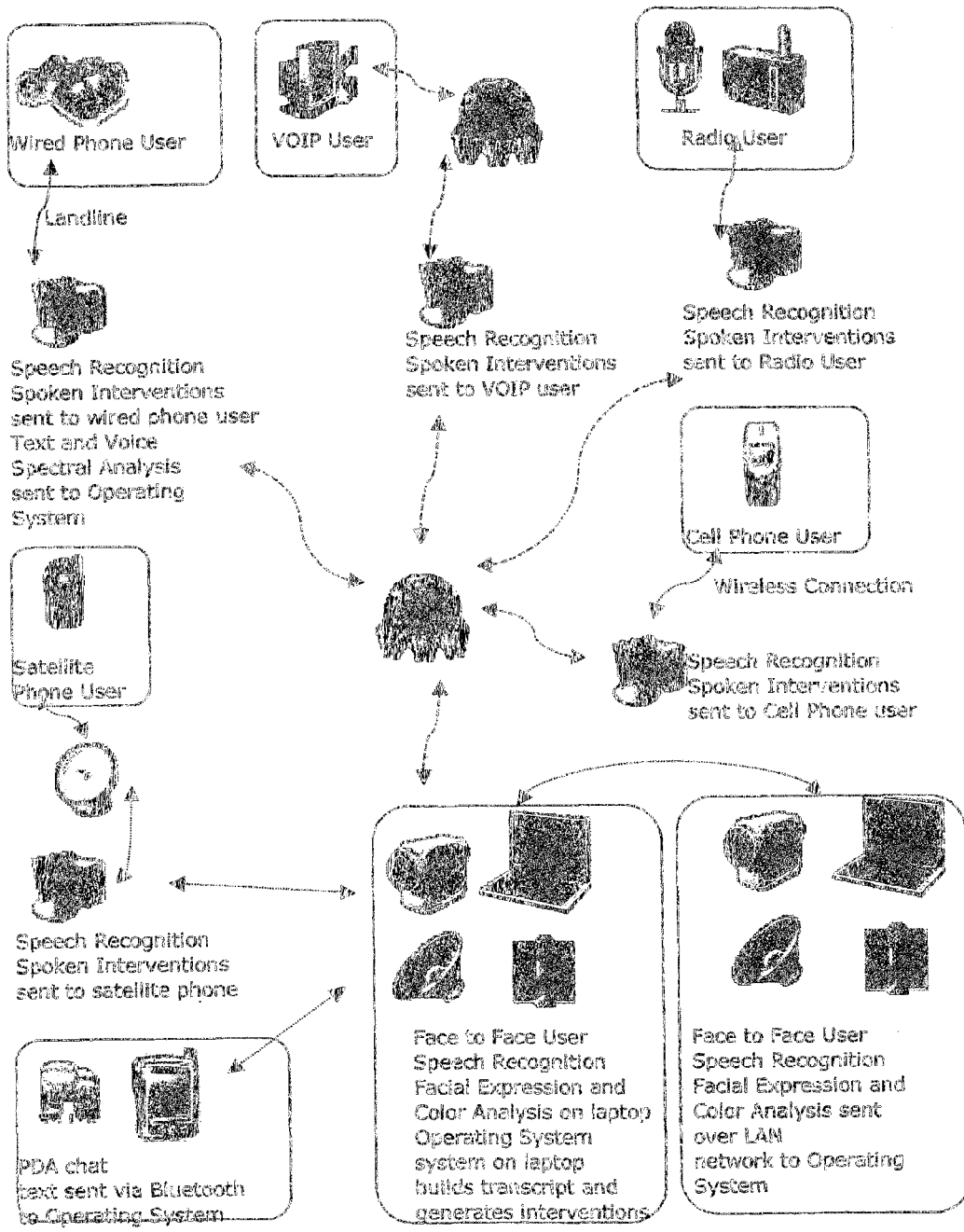
FIG. 2 is one embodiment of the networked complex for facilitating group interactions of this invention showing linkages between the multiplicity of components.
Figure 3:
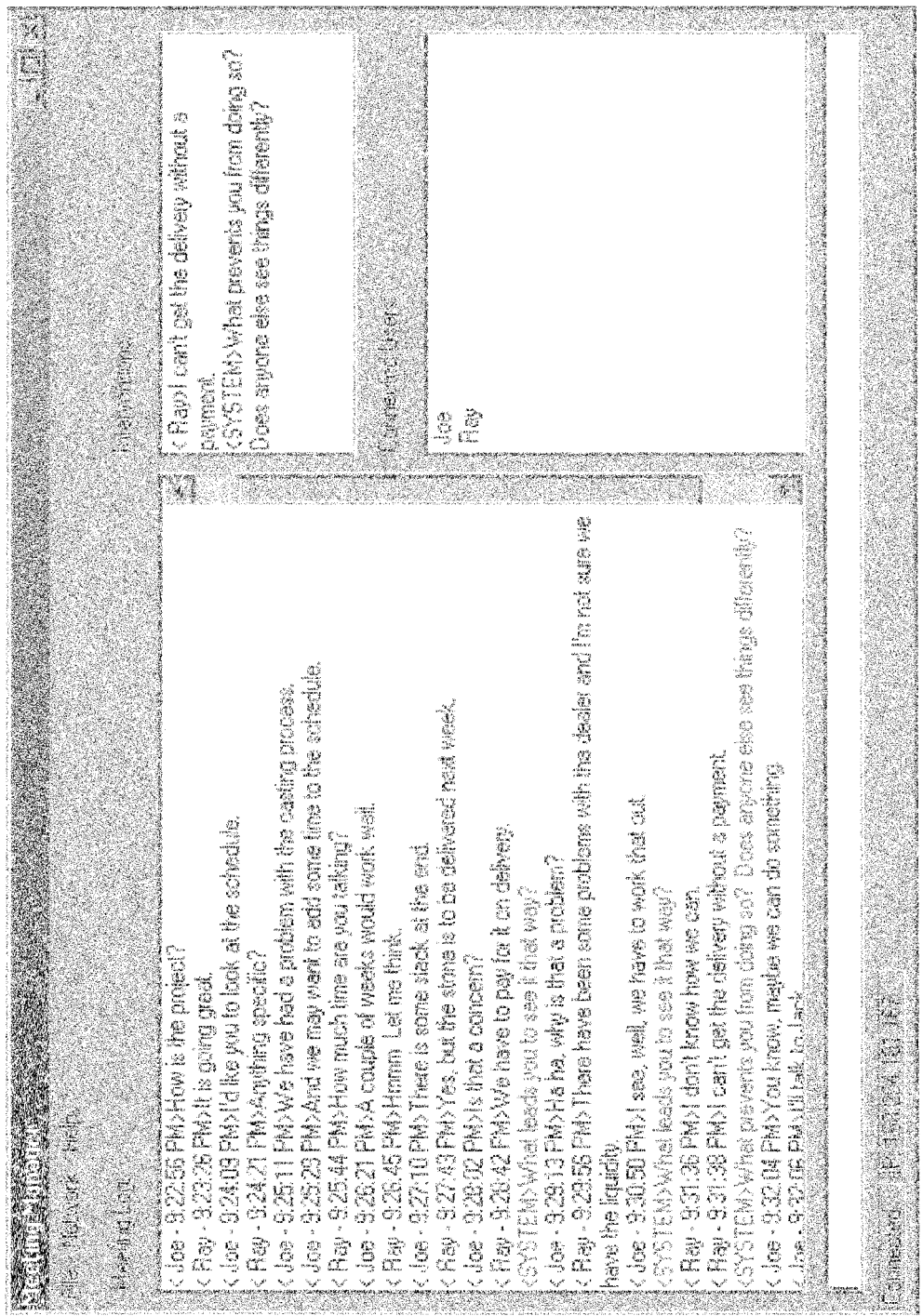
FIG. 3 is screen shot of a prototype of one output device of the networked complex for facilitating group interactions of this invention.
Figure 4A:
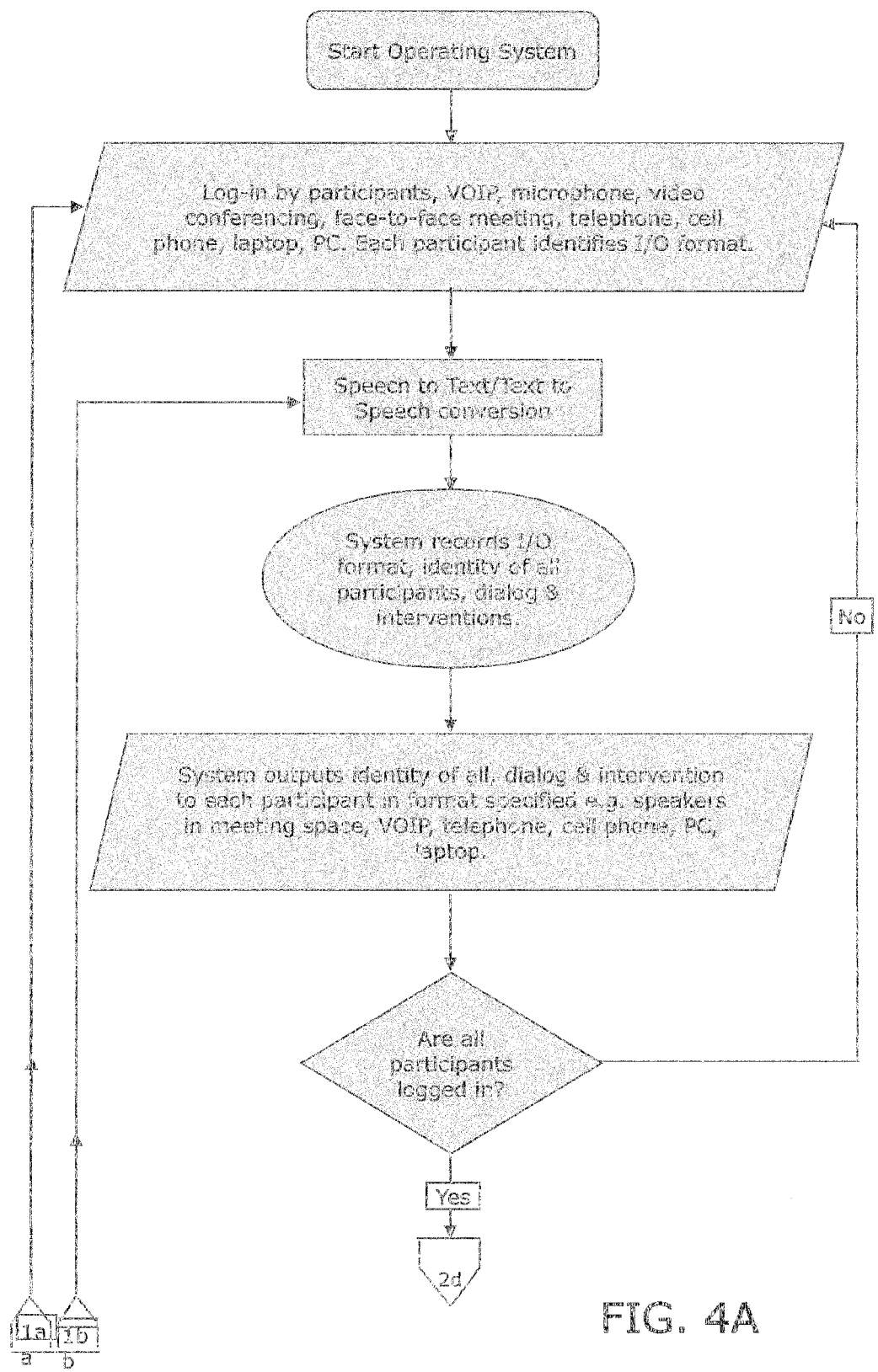
FIG. 4 is a detailed flow chart of the preferred embodiment of this invention on five sheets.
Figure 4B:
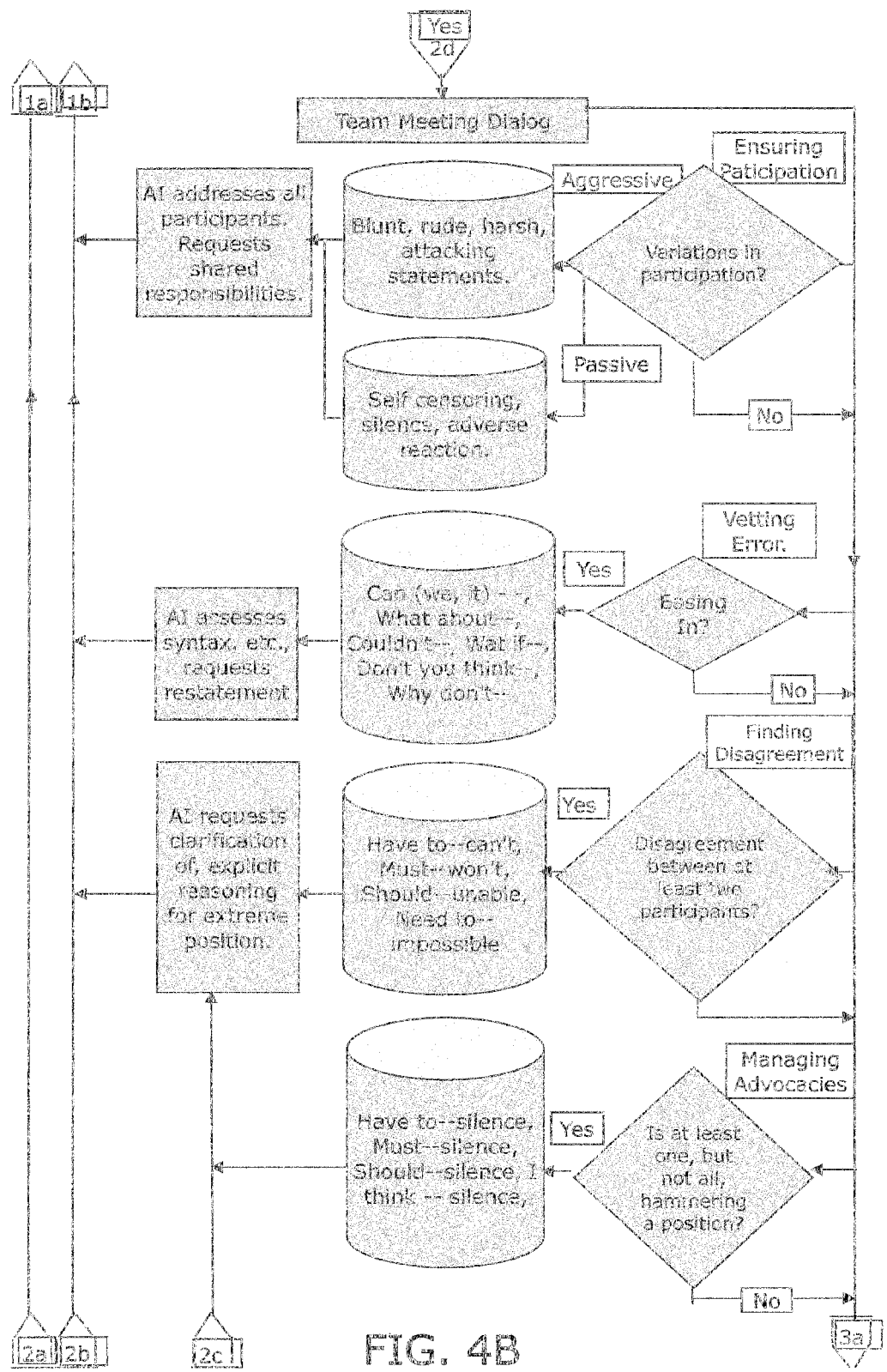
Figure 4C:
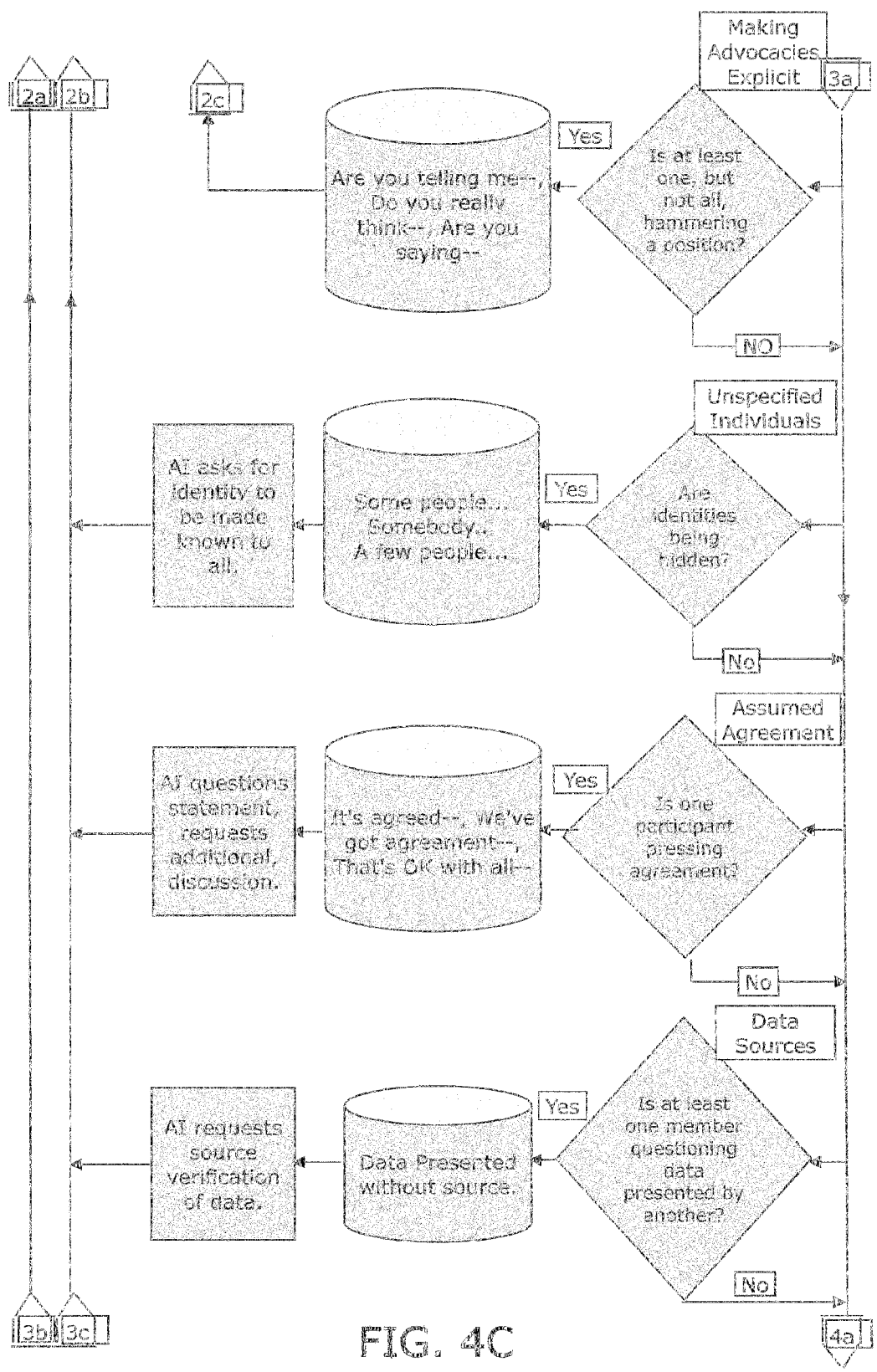
Figure 4D:
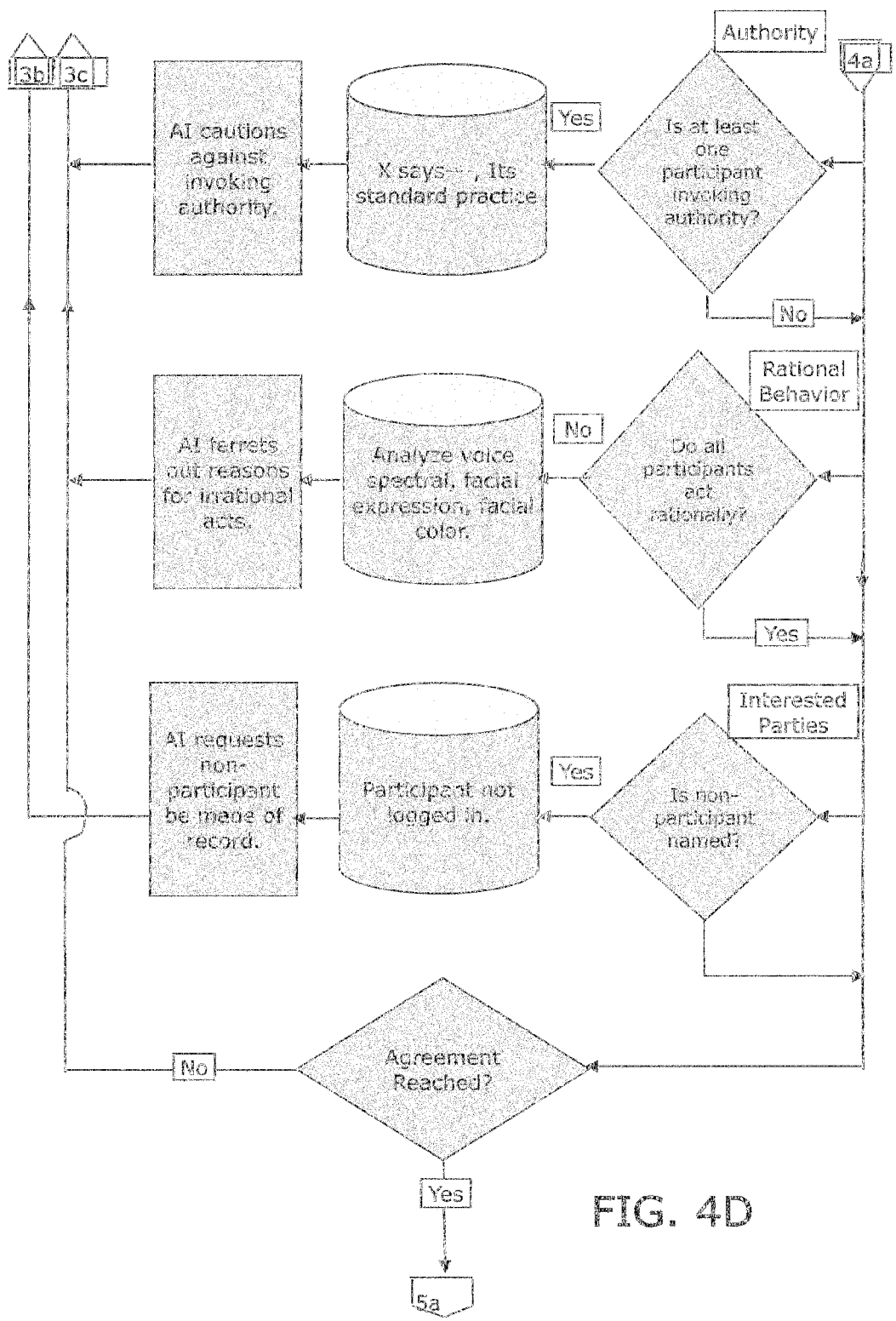
Figure 4E:
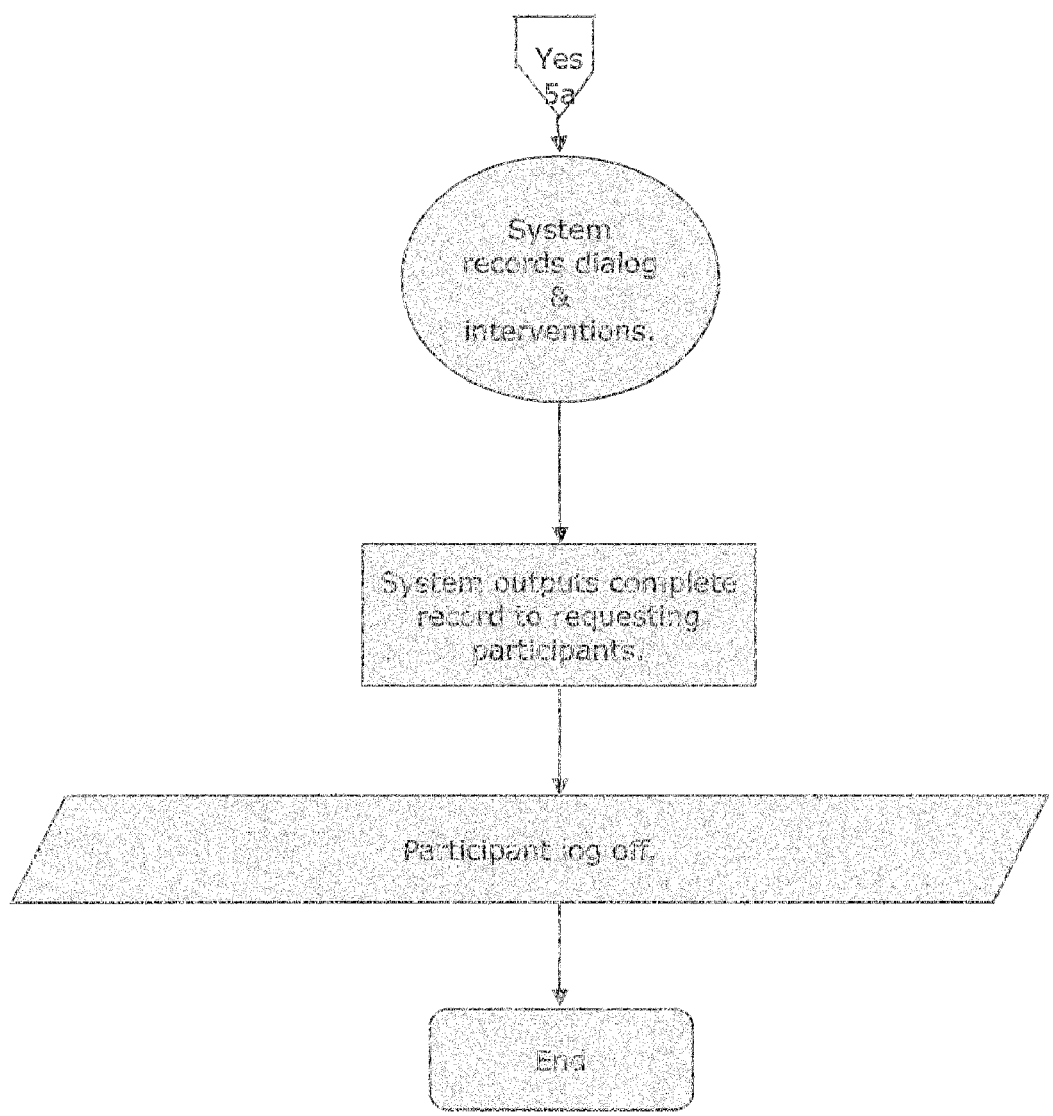

Based upon the research results, a prototype artificially intelligent system was developed in Java and tested in the example appearing below. Though the prototype was developed in Java, any other computer language could be used including, but not limited to, Perl, Lisp, Basic, Qbasic, C/C++, VB, VC++, Pascal, Cobol, HTML, Delphi, Assembly. The preferred networked complex described in this invention, as shown in FIGS. 1 and 2, comprises at least one user interface, at least one output device, an operating system having at least one database containing the artificially intelligent system, the artificially intelligent system comprising a plurality of rules and means for monitoring patterns of interaction, words, comparative words or phrases in an exchange of information to ferret out obstacles in proper decision known from the fields of organizational behavior and team facilitation. Though the user interface and the output device are typically computerized workstations where communication takes place between members of the group in a text format and the artificially intelligent system and means for monitoring patterns of communication are housed in a host computer, it is within the scope of this invention to provide for speech recognition technologies, handwritten text conversion and text to speech conversions to capture the exchange of information in face-to-face meetings, voice over internet, wireless, video conferencing, or telephone conversations. FIG. 3 shows a typical exchange of information along with those participating and the latest intervention. The entire exchange, including interventions is recorded within a means for monitoring. Though the information exchanged between members of a group is typically verbal or textual, it is within the scope of this invention to provide for monitoring and evaluating the facial expressions, body language, or other non-verbal/non-textual information exchanged between group members (e.g., scowls, grimaces, etc.).

The system comprises any kind of expert, rule based, genetic algorithm or other artificially intelligent system that monitors interactions occurring between individuals and/or groups and generates statements and/or questions based on theories and practices from organizational development, organizational behavior, or group intervention/facilitation designed to improve those communications. The system and method have no organizational bias, are not constrained by team dynamics and can question authority with some measure of impunity therefore effectively functioning as a third party interventionist. It should be fully understood at this juncture that the system and method is conversant only in words associated with theories and practice of organizational development, organizational behavior and group intervention/facilitation and is not conversant in the language of the group meeting facilitated and therefore, the Artificially Intelligent Agent and the intelligent system are unconstrained by organizational bias of the group members constituting the meeting, whether the members are from one organization or multiple organizations.

The following example is an excerpt from reports of the conversation of how the Space Shuttle Challenger launch decision was made (from "Personal Integrity and Accountability" by Roger M. Boisjoly in Accounting Horizons, 1993, volume 7, No. 1, pp. 59-69 and from "Groupthink, Revised Edition," CRM firms, 2215 Faraday Ave., Carlsbad, Calif. 92008.) The participants are Bob Lund, Vice President of Engineering at Morton Thiokol, Joe Kilminster, Arnie Thompson, Roger Boisjoly, engineers at Morton Thiokol and Jerry Mason, the senior Morton Thiokol executive. The example illustrates how the system and method of this invention might have provided interventions into the Challenger launch decision had the system and method been available and in use at the time of the decision making process. In this example, each participant has been identified to the system and speech recognition software, such as Dragon NaturallySpeaking is used, so that the group conversation is automatically transcribed into each participants' computer networked with all other participants' computers. It should be readily apparent here that the entire discourse between members is captured for subsequent review or publication by the system in electronic word processing format. Where the participants are gathered in a single location, a video display device may be used to project all communication in written format upon a large screen though audio speakers may also be used to communicate to the team using an electronic voice, however, it is fully understood that multiple input formats are supported by the complex and monitored by the artificially intelligent system and multiple output formats are also supported by the complex.

Referring now to FIG. 4, participants in the team meeting log into the operating system through at least one of the means for communication depicted in FIG. 2, though this invention is not limited to only those means for communication. During the log-in process, each participant identifies the input/output mode used by that participant. All speech is converted to text and all text is converted to speech such that the system maintains communication with each participant in the I/O mode specified. The system records the I/O format of each participant, the identity of each participant, all conversation between participants and any intervention inserted into the meeting dialog by the Artificially Intelligent Agent, (AI). Referring also to FIG. 1, the Artificially Intelligent Agent comprises a state analyzer to analyze visual and/or guttural emotions, a rule base housing rules effective for facilitation, a scheduler to insert interventions based on the historical record and a state history recorder that keeps track of the state of the conversation. Amplification of the functions of the parts of the Artificially Intelligent Agent may be found on the associated block diagram part in FIG. 1. Referring to FIGS. 1-4, the system then outputs to all participants the identity of all participants and I/O type in the format specified to ensure that all participants are logged in. If not, the system requests additional log in based upon inputs from participants properly logged in. Opportunities to add participants to the meeting surface when the system detects a name not in the log in record as the system is recording the entire conversation. This may occur at any point in the team meeting but usually is invoked when a non-participant is referred to in the conversation or is asked to join the conversation. After all participants are logged in, the team meeting proceeds, though of course, when a new participant joins the conversation, that person is logged in, as in the loop from the non-participant decision diamond to the log-in parallelogram. FIG. 4 is structured as a concurrent system once the dialog begins, though the system may also function in a specific hierarchy of decision diamonds. Accordingly, it should be fully understood that preferably the system is acting in real time, the decision diamonds are addressed simultaneously and the system remains active throughout the conversation until all participants log off.

Brodbeck, et al., Group Decision Making Under Conditions of Distributed Knowledge: The Information Asymmetries Model, Academy of Management Review, 2007, Vol 32, No. 2 pp 459-479, have provided an in-depth search of literature on decision making and conclude that organizational and individual biases hinder group decision making Although an individual's bias might prevent that individual from achieving his or her own goal, and therefore, that individual's health, as would be present in the teachings of Bro, above, the individual's bias in a group setting will affect the decisions of the group and hence the health of the overarching organization from which the group was formed and its products, processes, personnel, apparatus and structures.

First, Brodbeck, et al., say that asymmetry in information processing occurs because of social influence in team meetings. Social influence is an organizational bias. Specifically, individuals who may dissent from a dominant position tend to conform to that position to please the others. Furthermore, social influences usually consider only how many favor an alternative prior to discussion. Thus, hidden information, known to one or a few participants and which may be germane to the decision, seldom surfaces as the group is tending toward a quick decision by a voting process introduced early into the meeting. Brodbeck, et al., state, and support, that diversity in pre-discussion preferences and diversity in the expertise of members should help with pooling of information as it inspires confidence in individual expression of expert information and thus should reduce a quick voting scheme. A quick voting scheme is an organizational bias obviated by the Artificially Intelligent Agent resident in the intelligent system. Brodbeck, et al., also postulate that group members should not convince the group of their preferred position but rather educate the group about the importance of all the information known to that member. It will become readily apparent that the system of this invention delays the voting process by asking individuals to provide support for the position(s) postulated and to provide hidden information. For instance, where at least one member is pressing for agreement such as in the "Assumed Agreement" decision diamond by using forcing statements such as "It's agreed . . . " and/or "We've got agreement . . . " and/or "That's OK with all . . . " without a full discussion of the ramifications of the assumed decision, the Artificially Intelligent Agent of this invention will intervene with statements questioning such a quick decision and then calls for additional discussion until the team truly reaches a consensus. In individual goal setting as in Bro, there is no hidden information, the individual possesses the desire to change behavior and relies upon the coaching of the counselor, doctor, nurse or practitioner to effect that change. Additionally, in the teachings of Bro, there is no pattern to discover as all members of a joined group have the same symptoms.

Second, groups tend to discuss information known to most, if not all, participants in the meeting while suppressing information not known to others, that is, hidden information, because more group members can mention the known information. Discussing known information while suppressing hidden information is an organizational bias and follows closely with social influence. This often leads to the early voting process whereas prolonged discussion has a higher probability of surfacing hidden information. According to Brodbeck, et al., members learn more new information during continued discussions thus removing an organizational bias in the team meeting. It is also apparent that the system of this invention generally extends discussion time by attempting to ensure that all participate in the discussion and surface information known to individual members, but not all, before arriving at a decision. In contrast, in a joined group, where individuals are pursuing individual goals, there is no need for a voting process as all individuals follow the same regimen. Additionally, since the Artificially Intelligent Agent is conversant only in words of intervention or facilitation, the Artificially Intelligent Agent is unconstrained by the bias of the group or overarching organization(s) related to the conversation.

Third, individuals take into group meetings personal biases of favoring a particular position based upon information known to and favored by them, i.e., preference consistent, while suppressing or discounting information that does not support their particular position. Thus, it is unlikely that this "preference inconsistent information" known to individuals will be surfaced in the group meeting, even though that information may be germane to a proper decision. That preference inconsistent information may have been subjected to an evaluation bias by the individual, that inconsistent information may persist in the face of the same information surfacing by another during team discussions. A group related organizational bias impediment to decision making is group-think fostered by pressure toward uniformity, usually as a result of the culture imposed on the group as in a group lead by management, an homogenous group and/or a group with high cohesiveness. Also readily apparent, the system of this invention ferrets out suppressed information by keying on statements made and reiterated, inferences, facial expressions, gestures, etc., and by documenting the entire conversation for ready reference by members to previous statements and by attempting to promote participative leadership, that is, no one member dominates.

For instance, in the following example, the general manager, Bob Lund, says that a "management decision" has to be made and the artificially intelligent system questions this authoritative statement. Management influence is clearly an organizational bias as management influence guides decisions toward the preferences of management notwithstanding relevant technical information. An intervention in the concurrent step of asking if one member is invoking authority is made which continues the discussion beyond a quick management decision thus removing the organizational bias in favor of management. Some facts are then brought forward about the sealing of the primary O-ring without reference to a standard. An intervention is made in the concurrent step of asking if one member is questioning data presented by another as the artificially intelligent system asks for additional information Immediately thereafter, one member quickly agrees and an intervention is made by the Artificially Intelligent Agent of this system in the concurrent step of asking if one participant is pressing agreement. The artificially intelligent system also asks the agreeing member for further clarification why that person agrees so readily. Though there is only one member at this point who agrees, if multiple members, but not all, would happen to agree to this position, the artificially intelligent system could invoke a "groupthink" intervention in the concurrent step of asking if at least one, but not all, is hammering a position to indicate to the team they are straying from a factual position and then the artificially intelligent system would request dissenting viewpoints to be stated. Groupthink is yet another form of organizational bias, groupthink exhibiting characteristics of social influence, bias toward preference consistent information and quick voting. Then, through the first three exchanges, two individuals may be dominating the conversation wherein the system, through the Artificially Intelligent Agent, in the concurrent step of determining variation in participation, queries other members of the group to respond by asking a question, in the form of "(W)hat are your thoughts?" of each member. Alternately, the Artificially Intelligent Agent would say "responsibility is not being shared—it would be useful to explore how to share responsibility rather than relying upon one." In this manner, each member is encouraged to respond and become a functioning member of the group. If no response is received from a particular member, the system, through the Artificially Intelligent Agent, again in the concurrent step of determining variation in participation, asks for a specific response from that member regarding the specific topic being discussed. The question would take the form of "How does this affect the outcome?"

Aggressive and passive behaviors are organizational biases comprised of attitudes, perceptions, teachings and motivations of the organization as discussed in Robbins, above. Applicants have found that the Artificially Intelligent Agent is also able to discern aggressive behavior of one or more participants in the variations in participation concurrent step by detecting harsh criticism, rude behavior or attacking statements, usually beginning with "you" talking, which often results in passive behavior by other participants and, in particular, withdrawal of the participant being attacked. "You" talking consists of negative connotation statements usually beginning with "Your problem is . . . " or "What you said is wrong because . . . " or "You always . . . " or "You are . . . " thus putting the attacked person on the defensive. In order to manage aggressive behavior where one individual user has a tendency to be aggressive while others may exhibit passive tendencies, the Artificially Intelligent Agent will attempt to manage the deleterious effects on the conversation and on others by stating openly to all participants that (named participant) is exhibiting aggressive behavior and requests others to respond. A reiterative process ensues where the Artificially Intelligent Agent requests which facts all participants are able to agree upon. Once agreed upon facts are made a part of the conversation, participants, particularly previously passive participants, now feel enfranchised and able to contribute to the conversation.

Similarly, the Artificially Intelligent Agent may discern participants who exhibit passive tendencies even when an aggressive participant is not present as the Artificially Intelligent Agent is constantly tracking participation by all logged-in participants. When it has been determined by the Artificially Intelligent Agent that one or more participants are not contributing by the absence of response, or significantly reduced participation, the Artificially Intelligent Agent will ask those not participating if there is a reason for not participating by requesting those non-participants to state their feelings about particular facts or observations made during the course of the conversation. Non-participants are invited to share whether they are "Afraid of . . . ", Annoyed with . . . ", "Embarrassed by . . . ", "Confused by . . . " in an attempt to meet the needs of the non-participant(s), thus surfacing the hidden information cited in Brodbeck, et al. Since it is the words that indicate the particular organizational bias, the words resident in the database are the triggers of the Artificially Intelligent Agent of this invention. Therefore, the Artificially Intelligent Agent may ask active participants to restate the need(s) surfaced by the non-participant(s) in order to ensure that all participants understand the needs of all others so all may be active in the conversation.

Yet another variation in participation is flip flopping between aggressive behavior and passive behavior by an aggressive participant because the aggressive participant is first saying "I'm in charge, and you are not" until lack of response precipitated by the aggressive behavior, causes that aggressive participant to refer decision making to the passive participants by effectively saying "I'm quitting-you guys figure it out" thus exhibiting a passive behavior immediately following an aggressive behavior. The Artificially Intelligent Agent would then interject into the conversation a statement such as "responsibility is not being shared—it would be useful to explore how to share responsibility rather than relying upon one." The Artificially Intelligent Agent asks all participants to participate assertively by using "I . . . " language using statements such as "I believe . . . ", "My view point is . . . " or "I have come to this position because . . . " leading others to understand the positions of all others. Assertive participants usually have facts to back up the "I . . . " statements again surfacing information known only to one or a few. Accordingly, organizational bias demonstrated by aggressive/passive behavior is overcome by the Artificially Intelligent Agent of this system.

Next, it appears that another authority figure, George Hardy, may have information that does not surface in this conversation that the artificially intelligent system believes should be brought forward. A second time in the concurrent step of invoking authority, the artificially intelligent system further questions why the team "must listen to him." A statement is then presented about the safety of the launch at a particular temperature to which one participant heartily agrees. In order to ensure that the participant is not jumping to conclusions in the step of determining rational behavior by keying on the hearty agreement, the artificially intelligent system then asks the respondent for clarification of the highly positive agreement and further questions the respondent to clarify to which statement he has agreed. In the final exchange, it is again stated that a management decision needs to be made. For a third time, in order that authority does not affect the decision, in the concurrent step of asking if one member is invoking authority, the artificially intelligent system questions why the decision must be left up to a single person and requests that a consensus be reached. The artificially intelligent system shows that it is unrestrained by organizational dynamics and attempts to guide the team into a consensus decision thus removing the total burden from a single individual.

It should also be appreciated here, that the Artificially Intelligent Agent determines that in the concurrent step of naming a non-participant, another party might be beneficial whereupon the Artificially Intelligent Agent requests that the non-participant log in and join the conversation. Preferably, the Artificially Intelligent Agent will request that the team member citing a non-participant contact the non-participant and request that non-participant join the conversation by any one of the means of communication conversant with the system. Clearly then, facts stated in the conversation can be verified by inviting the non-participant to become a part of the conversation, again bringing hidden information to the forefront and removing the organizational bias associated therewith.

| TEAM COMMUNICATIONS | INTERVENTIONS BY THE SYSTEM |
|---|---|
| Bob Lund: Clearly, we have to make a management decision. | Bob said, "We have to make a management decision." What leads you to see it that way? |
| Jerry Mason: I want to make sure I've got this. The worry is that temperatures in the '20s or '30s could cause the primary O-ring to seal more slowly. If it did, we could get some blow-by. | Jerry said, "The worry is that temperatures in the '20s or '30s could cause the primary O-ring to seal more slowly." More than what? How, specifically, do you see it that way? |
| Joe Kilminster: That's right. | Joe said "That's right." What leads you to see it that way? |
| Jerry Mason: But don't we have some tests that show how the O-rings . . . Joe Kilminster: We have tests showing that even if a blow-by cut a hundred twenty-five thousands of an inch out of the O-ring it would still seal. | |
| Jerry Mason: I'll tell you, it makes an impression on me if George Hardy says he's appalled at something we recommend. | Jerry said, "I'll tell you, it makes an impression on me if George Hardy says he's appalled at something we recommend." What is it, specifically, that makes an impression on you? |
| Joe Kilminster: His point is, and I think you have to listen to him, is that even if you get to blow-by of the primary O-ring, the secondary O-ring is still in the proper position to seal. | Be careful that authority does not override safety considerations or facts? Joe said, "I think you have to listen to him." What leads you to see it that way? Arnie, what are your thoughts? Roger, what are your thoughts? |
| Arnie Thompson: Our charts may be inconclusive, our data insufficient, but everything we do shows we'll be safer launching at 53 degrees or above. | |
| Roger Boisjoly: That's clear, that's absolutely clear! | Roger said, "That's clear, that's absolutely clear!" What leads you to see it as clear? |
| Jerry Mason: It's time to make a decision. Bob, take off your engineer's hat and put on your management hat. | Jerry said, "Bob, take off your engineer's hat and put on your management hat." If pressure is being applied to take a specific course of action, it is likely that valuable viewpoints will not be shared. |

As stated above, Bob Lund, the general manager has said that a "management decision" has to be made. The artificially intelligent system keyed upon the phrase "(C)learly, we have to make . . . " focusing on the word "clearly" thus seeking the unstated reasoning behind the assertion. As the final system query at the end of this short excerpt of communication warns, pressure toward a certain course of action can squelch valid dissent. In this first statement, the artificially intelligent system looks in the dictionaries in turn for the imperative and returns both the statement made and an inquiry asking for clarification. With reference to the sample Java language below, dictionary 1 is searched in line 16, and having found "clearly" in dictionary 1, the artificially intelligent system then returns the question "(W)hat leads you to see it that way?" and could additionally further question the presenter with "(C)an you give specific examples?" The artificially intelligent system has no organizational bias nor is constrained by team dynamics and thus can continually attempt to guide the team toward consensus by guiding participants in the decision making process to pursue all threads of said decision making process until all threads are fully considered. Of course, the suggestions of the artificially intelligent system as displayed on the output device(s) of the networked complex may be ignored, however, the participants in the conversation might more readily respond to a suggestion from the artificially intelligent system whereas a trained facilitator/interventionist might be perceived to be representing a higher management position.

Sample Java Language

```
1 public class FilterSentence{
2 private String filtered=" ";
3 private Vector dictionary1=new Vector( )
4 private Vector dictionary2=new Vector( )
5 private Vector dictionary3=new Vector( )
6 private Vector dictionary4=new Vector( )
7 /** call to be made with the string to be filtered */
8 public FilterSentence(String tofilter){
9 String serverReactingString=null;
10 StringTokenizer st=new StringTokenizer(tofilter," ");
11 loadDictionary( )
12 while(st.hasMoreTokens( ){
13 String str=st.nextToken( )
14 //if (in Dictionary(str, dictionary1)) str="$%^@#";
15 //filtered=filtered+" "+str;
16 if (in Dictionary(str, dictionary1))
17 {
18 if (str.compareToIgnoreCase("it")!=0){
19 serverReactingString=
20 "What leads you to see it that way?, Can you give specific examples?";
21 break;
22 }
23 else{
24 if (tofilter.indexOf("it was clear to me")!=-1)
25 {
26 serverReactingString=
27 "What leads you to see it that way?, Can you give specific examples?";
28 break;
29 }
30 }
31 }
32 if (in Dictionary(str, dictionary2))
33 {
34 serverReactingString=
35 "Better(faster) than what?, How specifically do you see it that way?";
36 break;
37 }
38 if (in Dictionary(str, dictionary3))
39 {
40 //System.out.println("we got a match!!");
41 if (str.compareToIgnoreCase("can")!=0||str.compareToIgnoreCase("no")!=0)
42 {
43 //System.out.println("we got a match!!!");
44 serverReactingString=
45 "What prevents you from doing so?, (Does any one see things differently?)";
46 break;
47 }
48 else if(tofilter.indexOf("can not")!=-1||
49 tofilter.indexOf("no one can")!=-1)
50 {
51 serverReactingString=
52 "What prevents you from doing so?, (Does any one see things differently?)";
53 break;
54 }
55 }
56 if (in Dictionary(str, dictionary4))
57 {
58 serverReactingString=
59 "What leads you to see it that way?";
60 break;
61 }
62 filtered=filtered+" "+serverReactingString;
63 }
64 try {
65 if (serverReactingString.length( )!=0) {
66 System.out.println("we got a match!!!"+serverReactingString);
67 }
68 }
69 catch (NullPointerException n1)
70 {System.out.println("No Match");
71 }
72 }
73 /** returns the filtered word */public
74 String getFiltered( ){
75 return filtered;
76 }
77 private boolean in Dictionary(String s, Vector dictionary)
{
78 for(int i=0;i<dictionary.size( )I++)
79 if (s.equalsIgnoreCase((String)dictionary.elementAt(I)))
80 return true;
81 return false;
82 }
83 private void loadDictionary( ){
84 dictionary1.addElement("Clearly");
85 dictionary1.addElement("Obviously");
86 dictionary1.addElement("it"); //it was clear to me
87
88 dictionary2.addElement("more");
89 dictionary2.addElement("less");
90 dictionary2.addElement("most");
91 dictionary2.addElement("least");
92 dictionary3.addElement("Can't");
93 dictionary3.addElement("Can"); //can not
94 dictionary3.addElement("impossible");
95 dictionary3.addElement("no"); //no one can
96 dictionary4.addElement("should");
97 dictionary4.addElement("must");
98 dictionary4.addElement("expect");
99 dictionary4.addElement("encourage");
100 }
101 /** test stub */
102 static public void main(String args[ ]){
103 FilterSentence fS=new FilterSentence("It was clear to me");
104 System.out.println(fS.getFiltered( ));
105 }
106 }
```

The facts about the sealing of the primary O-ring appear to the artificially intelligent system to be incomplete as the comparison word "more" is used without reference to a standard. The artificially intelligent system indicates that information has been omitted which, if surfaced at this time, would assist with the consensus decision as well as presenting the total factual situation to other members of the launch team and later to the public. Referring back to the Sample Language above, the artificially intelligent system searches the dictionaries in turn and finding "more" in dictionary 2, the artificially intelligent system invokes the statement on line 35 and returns the question "(M)ore than what?, (H)ow specifically do you see it that way?" Therefore, the artificially intelligent system proves its utility in surfacing missing information in the team environment. The artificially intelligent system also requests clarification from the agreeing member of the team to state the facts and/or beliefs why the agreeing member agrees with the position taken. Though this specific reference does not appear in the Sample Language above, adding the element "right" to dictionary 1 would trigger the statement "(W)hat leads you to see it that way?" from line 20 wherein the networked complex would then automatically display or state the question to the group. In the conversation, only one member agrees, however, if multiple members would happen to agree to this position, the computerized, networked complex and embedded artificially intelligent system would likely indicate "groupthink" has surfaced and further guide the team back to a factual position.

One member of the team then indicates that a respected person would be "... appalled at something we recommend." The artificially intelligent system has keyed upon the phrase "... makes an impression ... " as an authoritative statement and request that the team member provide additional information that that team member may be aware of from the respected person and also asks about the source of that impression, warning that authority may override valid concerns or facts. Again, it should be readily apparent that the artificially intelligent system of this invention is not constrained by the organization, its authorities or the dynamics of the particular team or organization, and as the artificially intelligent system does not, and cannot access an human facilitator, the artificially intelligent system of this invention is also unconstrained by individual bias from a team member or external bias by any human. The computerized, networked complex and embedded artificially intelligent system allows for communications from various formats and it is certainly within the scope of this invention to contact George Hardy by one of the above-mentioned formats and ask why he is appalled. Therefore, the computerized, networked complex and embedded artificially intelligent system is useful in assisting the members surface and share information while communicating in a chat room via the Internet, in verbal communication in face-to-face meetings, in written e-mail communication, in verbal communication using a telephone, video conference, voice over internet technology or wireless device, in conversion of handwritten text from an electronic tablet or a combination of the above. Thus, the complex, system and method of this invention has utility across a broad spectrum of communication formats and thus has great utility with teams functioning in disparate locations. For instance, one location may have several members of the team gathered in one location communicating face-to-face while at least one other member of the team is at a remote location, such as a customer, the customer communicating with the team in one of the above-mentioned communication formats. In actuality, the studies underlying the Challenger launch decision took place before the final decision on the night before the launch. Thus, the decision comprised several meetings at the plant, at the launch site and involved at least one wide area networked conversation. Specifically, the exchange cited above is a private caucus of the engineering team at the plant during an extended telephonic decision making process with the launch team at the launch site. Likewise, all members of the team may be housed in different locations, the members of the team communicating in written format or through one of the combinations cited above. In fact, the interface may be selected from the group comprising hard wired telephones, wireless devices, voice over internet, video conferencing, written text input devices, microphones or combinations of the above and the output device may be selected from the group comprising hard wired telephones, wireless devices, voice over internet, video conferencing, written text output devices, audio speakers or combinations of the above. With the advent of instant messaging, it is within the scope of this invention to monitor text communications sent by instant messaging, converted from a text document using optical character recognition (OCR), e-mail text converted from an electronic tablet or other source or type of text. It is only necessary that the members of the team interface with the networked complex in one location such that the artificially intelligent system incorporated into the networked complex may respond with statements of intervention or facilitation to assist the members to fully surface and share all information necessary for the completion of the team task at hand.

Though there have been only three exchanges between the two persons, the program may consider that "dominating" behavior sufficient to trigger questions to the other members of the group. One method of checking for "dominating" behavior is for the networked complex with embedded artificially intelligent system to begin counting each statement by each person, incrementing upwardly until all members have been counted. At the point where all participants have been counted, the artificially intelligent system would drop the count of the first statement by the first person and check again for "dominating" behavior in a "rolling average" fashion thus tending to keep all members actively participating. This "rolling average" would be maintained throughout the communication. In the example, the "dominating" trigger statement occurs after the complex has asked for clarification on the last statement, but may, of course, precede that statement.

Additional data is then indicated that launching would be safer above 53 degrees to which one member of the team heartily agrees. The artificially intelligent system keyed upon the absolute word "clear" contained in the statement "(T)hat's absolutely clear." Absolute words may be selected from the group containing at least one of the words never, always, clear, definite, absolute, can't, impossible, unable or "no one can." The artificially intelligent system returns to dictionary 1, finds "clear" and returns the question "(W)hat leads you to see it that way?"from line 20. Although the information alluded to in this statement might be present and available to the team members, the artificially intelligent system asks for the underlying reasoning as to why the member of the team sees the statement as being clear. By so doing, the artificially intelligent system of the networked complex ferrets out missing information, thus ensuring shared understanding, increased communications, enhanced decision making and recording a complete record available for history.

Finally, in the example above, the artificially intelligent system again questions why this is a management decision and not a team decision.

The knowledge embodied in the artificially intelligent system is of great importance. The networked complex provides the first conceptualization and demonstration that knowledge from the fields of organizational behavior, organization, development, and/or team facilitation/intervention can be embodied in an artificially intelligent system. Facilitators and interventionists also encounter patterns of interactions within the group environment that are selected from the group comprising groupthink, domination of discussion by one or a few members, absence of discussion by at least one member, agreement without discussion or data, ignoring suggestions from one or more members, conformance to management directives or a combination of the above. Other problems encountered in team meetings comprise comparative words such as more, less, least, most, negative phrases selected from the group containing at least one of the words can't, impossible, unable or "no one can," absolute words selected from the group comprising clear, definite, absolute, should, must, expect, encourage, never, always, "need to" or "have to" or words ending in -ly, -er or -est. The trained facilitator readily keys upon these words and phrases and provides questioning statements to the team to clarify the position stated or taken. Though it was not illustrated in the NASA example, a trained facilitator also readily keys upon non-verbal information that is transmitted by gestures, facial expressions, body language, etc., which is then used as triggers for group facilitation and intervention. By embodying the knowledge of the trained facilitator or interventionist in the database of the networked complex, the artificially intelligent system may interject appropriate questions or statements into the team communications upon detecting the words phrases, and/or non-verbal information. Individual users may create functionality for the Artificially Intelligent System by establishing new interventions and rule sets as set forth before and hereinafter. The Artificially Intelligent System, after the vetting process described below is completed, adds these new interventions and rule sets permanently to the database for use by participants in later processes. Additionally, the knowledge embodied in the artificially intelligent system considers terms of communication that indicate the possibility that information was deleted and generates questions to help individuals surface that information and share it with others. When a rule-based implementation of this artificially intelligent system is used, the two main advantages of rule-based systems may be exploited. First, rules are readily understood by humans and second, they are relatively easy to modify dynamically. New behavior or new understanding of existing behavior can be incorporated into the system by simply adding rules to the dictionaries, without the need to modify the previous rules, however, additional rules may be added as needed.

The fields of organizational behavior, organization development, and/or team facilitation/intervention are as dynamic as any other field of endeavor. No one participant, student, researcher or expert can possess all the knowledge in these fields and thus it becomes important to incorporate thinking and practice from multiple sources such that emerging methodologies are available to managing processes by the Artificially Intelligent System. Thus, the Artificially Intelligent System of this invention has each user or participant establish an individual account for access to the Artificially Intelligent System wherein the user may add, edit or delete interventions in the individual's account wherein each intervention is keyed to a rule set as fully explained hereinafter. The Artificially Intelligent System applies new interventions entered by individual users in their accounts to decision making processes under use in the Artificially Intelligent System and further uses a genetic or other evolutionary algorithm to establish new interventions from at least one of emerging methodologies, known interventions and new interventions added by individual users to the Artificially Intelligent System in said individual user accounts. The Artificially Intelligent System may further use the genetic or other evolutionary algorithm to randomly combine rules to create new rule sets. As all new interventions are used in real time in managing processes in the Artificially Intelligent System, users rate all new interventions established by the Artificially Intelligent System, interventions added by users and interventions known from said fields or developed from emerging methodologies. By rating all interventions, these interventions are vetted and best practices are established whereupon the Artificially Intelligent System is able to provide the most up to date of emerging methodologies. It should be readily apparent therefore, that users may continue to add interventions and rule sets to their individual accounts whether these users are participants in a process, researchers in the fields of organizational behavior, organization development, and/or team facilitation/intervention, students or other interested persons.

It is also observed that in the middle of the communication, Joe Kilminster uses a similar phrase "have to listen to him" which triggers the artificially intelligent system to question why it leads the communicator to so state. Here, the communicator, in this case Joe, can expand upon the reasoning behind the redundant seals and/or upon why George Hardy might be appalled at the recommendation apparently made previously. In this particular exchange information, the artificially intelligent system may also question Joe Kilminster to clarify the pronouns "his" and "him" to ensure that a proper record is kept concerning the origin of the opinions and data surrounding the task used to make the instant and subsequent decisions. For instance, in the hidden identities decision diamond, the Artificially Intelligent Agent keys on words such as "Some people . . . " or "Somebody . . . " or "A few people . . . " or pronouns such as used in the example whereupon the Artificially Intelligent Agent asks that the identity be made known to all. In fact, it is possible that at least one of these hidden identities might have factual information germane to a proper decision process, again surfacing hidden information to all participants. In fact, it is within the scope of this invention to ensure that the decision making process bestows ownership of certain tasks to be completed upon certain individuals within the team, whether or not that individual physically accomplishes the assigned tasks or delegates the tasks. Ownership of the tasks resides with the participant assigned the task and, considering the history of each meeting has been made a permanent record, reference to the history will establish ownership of all the tasks. Additionally, the method of this invention may incorporate other group process facilitation concepts into the artificially intelligent system. For instance, the method may request that a length of meeting be established after all members have been identified to the networked complex thus triggering an internal clock. At specified intervals, the artificially intelligent system may remind the team of the time remaining in the meeting and should request approximately half way through the meeting that actionable items be recorded. At the end of the time frame, the artificially intelligent system requests that ownership of the actionable items be established. A chime or other audible tone may be used to signal an intervention by the artificially intelligent system followed by a display or announcement of the time, an intervention statement, actionable item, ownership or meeting end.

The method employed in the networked complex will also apply to other patterns of interaction that can be used by the artificially intelligent system to generate statements and/or questions. For example, one typical pattern of interaction involves one party asking another party a series of questions designed to lead of the recipient to a desired conclusion. This pattern is often used when one person thinks another has made a mistake but does not want to say so directly. The participant asks a series of questions designed to guide the other towards the "correct" answer. The dialogue shows a series of questions asked by one member and the other may show signs of emotional upset such as reddening of the face or tightening of the voice. The series of questions may be indicated by sentences beginning with the following (or other) interrogatory words: "can (we, it), what about, couldn't, what if, don't you think, why don't." (For example, "(H)ave you thought about X?", "Is there anything else you might consider?"). This pattern of communication has negative consequences that include the reduction of trust. A set of statements and questions can be developed and triggered by this pattern to improve communication. In one emerging methodology, "easing in" can be managed by the Artificially Intelligent System by setting a timer after any one of the typical "easing in" statements is introduced by a participant. If additional "easing in" statements are made within the preset time limit established by the timer, the Artificially Intelligent Agent, upon hearing the apparent interrogatory words again would insert an intervention such as "(B)ased upon the recent series of questions, it sounds like one or more people in this conversation believe that there may be some errors being made. Is this the case?" If one participant responds positively, the Artificially Intelligent System can insert a further intervention such as "I recommend that you state clearly what errors you believe may have been made and then inquire to see if there is any disagreement (and if so, why)." The method can also implement many other patterns of interaction as triggers for intervention, including those indicative of groupthink (such as the absence of disagreement or lengthy silence from one or more participants), assumed agreement, the "risky shift" phenomena (group polarization toward excessive risk), domination by one or a few members of the team/group, disagreement and statements relating to unfavorable beliefs or attributions about others.

In a step of questioning a data source, the Artificially Intelligent Agent attempts to make a data source part of the permanent record. For instance, in the exchange above, Joe Kilminster says "We have tests showing that even if a blow-by cut a hundred twenty-five thousandths of an inch out of the O-ring, it would still seal." In another part of the conversation, Arnie Thompson says " . . . we'll be safer launching at 53 degrees or above." After each of these statements, the Artificially Intelligent Agent asks that the test report be cited explicitly with information specifying the testing standard, the date of the test and degree of confidence in the test data.

In disagreement, alternating exchanges between the participants include the words "can't/must" or similar opposing statements. Particularly, one side of a conversation advocates a particular position while the other side disagrees by saying that such actions are not possible. This often occurs when people focus on positions rather than their interests and needs. The Artificially Intelligent Agent contains these dipole statements in the database and intervenes upon hearing the disagreement statements. The goal of the intervention is to help both sides state their interests and needs to help create a win-win outcome. For instance, the dialogue shows an interaction pattern where one person engages in a series of advocacies characterized by the following (or similar) words, "have to", "must," "should," "need to," while the other side responds by disagreeing with dialogue containing indicators of impossibility characterized by the following (or similar) words like "can't," "unable to" and/or "impossible." The Artificially Intelligent Agent then intervenes in the step of disagreement and might say "It seems that you may be stating your positions without explaining the reasoning and interests that underlie those positions." "Do any others disagree, please respond by saying yes or no." "If you are willing, it would be helpful to say what is underlying your position by stating your interests and needs in this area." "Would you both be willing to do this?"

Yet still another intervention is needed when one side of a conversation advocates a particular position and the other responds by questioning what was said, with an inference that the first speaker's position is untenable. Indicators are characterized by the following (or similar) words, "have to", "must", "should" and/or "need to" from the advocacy side of the argument while the dissenting side responds by questioning the first speaker's position characterized by the following (or similar) words, "are you telling me", "do you really think" and/or "are you saying." The goal of the intervention is to test the inference by making it explicit, while helping both sides to share their perspectives. Thus, the Artificially Intelligent Agent, in this step of making advocacies explicit, might address the second speaker by name, stating: "your statement implies that you may not be in agreement with what was just said, is this correct?" If the response is yes, the Artificially Intelligent Agent continues the intervention with: "Are you willing to explain your reasoning and ask others if they see things differently?" This intervention will extend the discussion and surface relevant information such that the sides can come to some agreement. In a related intervention step of managing advocacies, one side of a conversation advocates a particular position (sometimes repeatedly) using words as stated above, while the other side does not respond. This can indicate an aggressive or dominating stance on the part of the side making the advocacy, while the other side is passive and subordinate. The goal of the intervention is to help the passive side state their reactions either by asking them directly or by asking the aggressive individual to ask them. The Artificially Intelligent Agent would then intervene with "You just said (repeat the advocacy)," followed by the intervention statement "Would you be willing to ask others about any problems they see with what you are saying? If you get their input you may be able to improve it by taking their ideas into account." Alternate intervention statements might include: "Can you describe what, specifically, leads you to see it that way?" or "Can you explain your reasoning so that others can understand it better? "

Assumed agreement is indicated when one side of a conversation indicates that an agreement has been reached where one person on that side makes the following (or similar) statements: (I)t's agreed, (W)e've got agreement and/or that's OK with everyone. The goal of the assumed agreement intervention is to make sure that there is actually agreement that is understood by all participants. Thus, keying upon the words "agreed" or "agreement" or "OK with everyone" or similar statements, the Artificially Intelligent Agent might interject: "(W)ould you be willing to state what you believe there is agreement on and then check with others to see if they have the same understanding or disagree?" If such is truly the case, and other interventions are not required, the system can move toward completion by recording the final agreements from all participants, outputting a complete record of the discussion to all who request same, including all participant identities and interventions by the Artificially Intelligent Agent and requesting participants to log off. The operating system may also remain active for intervention in other meetings and will be available for resumption of any particular meeting upon log in by participants thereof.

Another intervention is called for in the conversation where the name George Hardy surfaces. Here the Artificially Intelligent Agent recognizes that George Hardy is not one of the participants and requests the team members to include George Hardy in the team meeting conversation. The system would then receive George Hardy as a participant by logging him in the log in block whereupon the system then outputs to George Hardy the entire transcript up to this point in the format identified by George Hardy. The conversation can then resume. If George Hardy's presence in the conversation is not necessary because of a report issued by George Hardy including data supporting the position articulated, then the Artificially Intelligent Agent would ask the team member presenting the data to cite the document containing the comment(s).

The method of this invention can also make use of non-verbal indicators to trigger facilitation or interventions, including non-verbal interactions collected by video cameras and analyzed by the artificially intelligent system. This can include information such as facial expressions, body language, color changes (such as reddening of the face), increased blood flow to certain parts of the face observable by infrared cameras, etc. This method makes use of the application of tools (such as "Facial Expression Analysis"—described at the Robotics Institute website of Carnegie Mellon University developed under a grant from the National Institute of Mental Health) which automatically recognizes human emotions underlying facial expressions. The method of this invention can use facial expression information to trigger group interventions as a human interventionist might recognize facial expressions and use them as triggers to interventions. Thus, it is within the scope of this invention to incorporate various potential patterns of communications or indicators to trigger responses using the computer-based network and embedded artificially intelligent system.

In the example, Roger Boisjoly triggers a response from the artificially intelligent system by using the terms "clear" and "absolutely." These definitive statements should have some justification other than just pointing to the statement previously made. Perhaps there is additional information that would support the statement made by Arnie Thompson, for instance, test data or other information from a supplier or known in the industry. In like manner, early in the conversation, Jerry Mason triggers a response from the artificially intelligent system by using the comparative word "more" wherein the system is requesting Jerry Mason to clarify and perhaps amplify upon the use of the comparative term.

Though repeated behavior requiring a particular intervention is not present in the above example, another intervention made by the Artificially Intelligent Agent of this system is pointing out patterns of interaction indicating repeated occurrence of a particular behavior. For instance, if a participant would invoke authority on several exchanges of information, the Artificially Intelligent Agent would interject into the conversation a question along the lines of: "(Y)ou have invoked authority on several occasions. Are you willing to discuss why this is the case?" In another instance, if the group repeatedly engaged in easing in where the group appears to feel an error has been made in a statement, the Artificially Intelligent Agent could ask "Would you be willing to discuss why?" or "What are you needing that you are not getting?" In this way, the Artificially Intelligent Agent discovers patterns of interaction, such as invoking authority, apparent reluctance to discuss a subject, unvoiced belief in a mistake or failure to consider at least one alternative from specific words within the conversation, that require intervention and solution, encourages surfacing of hidden information and promotes additional conversation. Each rule may contain a condition in order not to intervene when the participant continues the discussion with clarification or amplification. For instance, in a statement made by the participant with words to the effect of "you never" would invoke the intervention "What are you needing that you are not getting?" unless the participant's statement also contained any statement like "I'm unhappy because . . . " or I'm upset because . . . " including all of "I'm upset because my need for . . . or . . . is not met." The reason why the additional statements would cause the intervention to be withheld is because the participant explained the reasoning behind the accusatory words of "you never." Thus, interventions carry with them rule sets comprised of Boolean operators selected from the group consisting of "and," "or," "not," "Nand" and "Nor" or a "matching word," and word combinations wherein the word combinations are obvious clarifications or amplifications of the root words or phrases for the intervention.

In one embodiment, the networked complex comprises several components.
1) a component to monitor communications comprising a microphone coupled with speech recognition software and additional software to monitor text streaming between parties,
2) a component, such as an artificially intelligent system, to evaluate the communications using text base rules, neural network, genetic algorithm or other form of artificial intelligence,
3) a component to suggest statements or questions to the participants in the communication using an artificial voice, a video display of written text or text in a chat room window.

The networked complex and embedded artificially intelligent system will enact the following processes.
1) scan the incoming stream of interaction information,
2) identify triggers for statements/inquiries for intervention, clarification or facilitation of the communication,
3) generate and communicate statements/inquires available to the participants in the communication.

One example of an implementation of the networked complex and embedded artificially intelligent system of this invention uses inquiries to assist individuals communicating in an electronic chat room share information more effectively. This implementation is based on theories that suggest when people speak or write they leave out certain information. This missing information would better illustrate the communicator's reasoning thus opening it up to question. The embedded artificially intelligent system would monitor the stream of conversation exchange between the individuals in the chat room and look for certain phrases or keywords. The phrases or keywords then are used to trigger inquiries. The following table includes a few keywords or phrases and the inquiry triggered because of the specific keyword or phrase.

| Key words or phrases | Inquiries triggered |
| --- | --- |
| Adjectives ending in -ly phrases such as "It is clear" | What leads you to see it that way? Can you give specific example? |
| Comparative words: more/less, most/least . . . | More/less than what? |
| Words with -er or -est ending. | How, specifically, to you see it that way? |
| The phrase "I (you, he, she, we,) can't . . . | What presents you from doing so? |
| Words such as impossible, unable . . . | Does anyone else see things differently? |
| The words "should, must, expect, encourage, need to, have to . . ." | What leads you to see it that way? |

As the keywords or phrases occur in the communications, the networked complex causes the inquiries to be communicated to the participants such that the participant making the statement may provide additional information, clarify the meaning or justify the position taken such that the thread of the communication may be further explored. It should become readily apparent, however, that the additional information, clarification or justification may generate additional keywords or phrases again triggering the artificially intelligent system to communicate additional inquiries through the networked complex. Once all participants are satisfied that the thread has been fully developed, the keywords and phrases should disappear from the communications and agreement between the participants should be reached. Thus, the participants have reached agreement on the subject at hand using the artificially intelligent system facilitator/interventionist without terminating the artificially intelligent system itself or without the artificially intelligent system reaching its own terminus.

The networked complex and embedded artificially intelligent system is particularly useful for multiple, simultaneous users. At the outset of a communication set, each user provides an access code either digitally or verbally to the networked complex such that the artificially intelligent system may recognize each individual of the multiple, simultaneous users during the communication set. Speech recognition software, such as Dragon NaturallySpeaking may be used to advantage where verbal communication is used in the communication set. Verbal communication may occur in a face-to-face meeting where all participants speak into a common microphone or into individual microphones all linked to the system. In a face-to-face meeting, the networked complex returns inquiries back to the participants as text upon a display device such as a computer screen, television, overhead projector or verbally through an audio speaker. Verbal communication from an electronic voice over an audio speaker has been found to disrupt the communication set the least as it appears only that another voice has joined the communication set. Though a common means of communication is preferred, it is possible to receive verbal communication into the networked complex from individual users using wireless verbal communication devices such as cellular telephones, walkie-talkies or hardwired telephones. Inquiries from the artificially intelligent system are then transmitted to the individual participants in the same format as received from the individual participants, however, all participants in the communication set receive all inquiries generated by the artificially intelligent system. Where disparate means of communication are used from participants in disparate locations, use of a display device may also be effected if properly connected to the networked complex. Thus, it is possible for participants to participate in a communication set verbally and receive inquiries from the artificially intelligent system as text upon a display device such as a personal computer screen.

In the prototype embodiment of the artificially intelligent system, communication occurs over the internet in chatspace in a JAVA applet wherein the application window is split into four sections. A major portion of the window comprises the upper left hand section which records a rolling record of the current conversation between the participants. The time of each statement precedes the name of the participant making the statement. Below the conversation record is the interface dialog box and a "send" button. The dialog box is used to log onto the system and for inputting the participant's statement and questions to the conversation. As each user logs onto the system, that user's name appears in the participants list on the right side of the window adjacent to the dialog box under the last recorded user who logged onto the system. In this manner, every participant is known to the system and to each other. The fourth section of the window appears above the participants list and to the right of the conversation record and shows the interventions by the artificially intelligent system. The interventions by the artificially intelligent system may also be recorded in the conversation record as a participant in the conversation. In the example above, the conversation is a private caucus between the engineers and, if the method, artificially intelligent system and networked complex of this invention had been implemented, this excerpt would have been recorded in the larger conversation but the participants' list would not show the launch team members as participants in this portion of the conversation. As this caucus occurs, if the launch team continues to meet, a separate team meeting conversation record would be recorded in a parallel record as part of the larger conversation since the caucus occurs while the telephone hookup is on mute. Thus, the method, artificially intelligent system and networked complex of this invention can simultaneously record and intervene in separate conversations yet join these conversations together in a permanent record. Of course, if the artificially intelligent system is intervening in two separate conversations by different team members discussing unrelated subjects, the networked complex does not join the conversations. It is possible that one participant could be simultaneously logged into multiple conversations, both conversations subject to intervention by the artificially intelligent system wherein the conversations would also not be joined together in the permanent record unless directed by a system administrator.

While the present invention has been described with reference to the above described preferred embodiments and alternate embodiments, it should be noted that various other embodiments and modifications may be made without departing from the spirit of the invention. Therefore, the embodiments described herein and the drawings appended hereto are merely illustrative of the features of the invention and should not be construed to be the only variants thereof nor limited thereto.

We claim:

1. An artificially intelligent system for continuously facilitating a decision making process between at least two participants charged with a specific charter, said charter having an effect upon at least one process, product, apparatus, structure, organization, non-participant and combinations thereof, wherein said artificially intelligent system focuses on selected words in said decision making process, said artificially intelligent system applying rules of intervention known from or developed from emerging methodologies in the fields of organizational development, organizational behavior and group intervention/facilitation based upon said selected words, said artificially intelligent system returning inquiries to said decision making process based upon said selected words to guide participants in the decision making process to pursue all threads of said decision making process until all threads are fully considered wherein said inquiries from said artificially intelligent system are transmitted in the same communication format as received and wherein said emerging methodologies are applied to said artificially intelligent system by users thereof.

2. An artificially intelligent system as in claim 1 wherein said inquiries are transmitted to all participants in said decision making process.

3. A artificially intelligent system as in claim 1 wherein each said user establishes an individual account for access to said system wherein said user may add, edit or delete interventions in said individual account wherein said intervention is keyed to a rule set.

4. A artificially intelligent system as in claim 3 wherein said artificially intelligent system applies said interventions from said individual user accounts to said decision making processes.

5. A artificially intelligent system as in claim 4 wherein said artificially intelligent system uses a genetic or other evolutionary algorithm to establish new interventions from at least one of said emerging methodologies, said known interventions and said interventions added by said individual users to said artificially intelligent system in said individual user accounts.

6. A artificially intelligent system as in claim 5 wherein said users rate said interventions established by said artificially intelligent system, said interventions added by said users and said interventions known from said fields or developed from said emerging methodologies.

7. An artificially intelligent system comprises at least one database containing a plurality of rules, artificial neural network, genetic or other evolutionary algorithm, or other form of artificial intelligence, said artificially intelligent system continuously monitoring patterns of interaction indicating repeated occurrence of a particular behavior, comparative words or phrases in an exchange of information between at least two communicators charged with at least one specific charter, said charter having an effect upon at least one process, product, apparatus, structure, organization, another person and combinations thereof, to ferret out obstacles in proper decision making, said obstacles known from the fields of organizational behavior and team facilitation and wherein said artificially intelligent system is continuously active and unconstrained by human facilitator intervention throughout said exchange of information, said means for monitoring patterns of interaction triggers statements of intervention based upon certain of said patterns of communication, certain of said words and certain of said phrases, said artificially intelligent system acting in real-time relying upon guidance gleaned from a knowledge base from or developed from emerging methodologies in the fields of organizational behavior, organization, team management and team function, said knowledge base housed in said database and wherein said patterns of interactions are selected from the group consisting of groupthink, domination of discussion by one or a few members, absence of discussion by at least one member, agreement without discussion or data, ignoring suggestions from one or more members, conformance to management directives, apparent reluctance to discuss a subject, unvoiced belief in a mistake, failure to consider at least one alternative or combinations thereof.

8. An artificially intelligent system as in claim 7 wherein said words are selected from the group consisting of words ending in -ly, -er or -est.

9. An artificially intelligent system as in claim 7 wherein said artificially intelligent system generates and communicates a response through said output device requesting specific examples to justify a communicator's statement.

10. An artificially intelligent system as in claim 7 wherein said artificially intelligent system generates and communicates a response through said output device requesting clarification of the communicator's statement.

11. An artificially intelligent system as in claim 7 wherein said comparative words are selected from the group consisting of the words more, less, least, most, greater, lesser, better, faster, worse, slower.

12. An artificially intelligent system as in claim 7 wherein said artificially intelligent system generates and communicates a response through said output device requesting specificity with regard to said comparative word.

13. An artificially intelligent system as in claim 7 wherein said phrases are selected from the group containing at least one of the words clear, definite, absolute, can't, impossible, unable, none, should, must, expect, encourage, need and have and cannot.

14. An artificially intelligent system as in claim 13 wherein said artificially intelligent system generates and communicates a response through said output device requesting clarification of particular obstacles preventing completion as stated.

15. An artificially intelligent system as in claim 7 wherein said means for monitoring patterns of interaction triggers statements of intervention based upon facial expressions or body temperature change.

16. An artificially intelligent system as in claim 15 wherein said artificially intelligent system generates and communicates a response through said output device requesting clarification of definitive words.

17. A method of facilitating consensus building in team proceedings charged with a specific charter, said method comprising the step of providing a networked complex comprising a plurality of user interfaces, at least one output device, an operating system and an artificially intelligent system, said artificially intelligent system comprising at least one database containing a plurality of rules, a state analyzer, a state history recording device and a scheduling processor, said artificially intelligent system focusing on selected words, comparative words and phrases in exchanges of information between a plurality of communicators to ferret out obstacles in said consensus building, said rules and said obstacles known from or developed from emerging methodologies in the fields of organizational behavior and team facilitation, the next step of allowing said plurality of communicators conversing in said team proceedings to log onto said networked complex through at least one of said plurality of user interfaces, the step of identifying individual communicators of said plurality of communicators, the step of identifying said user interface and said output device of said individual communicators, the step of monitoring and recording communications between said plurality of communicators, the step of instantly communicating said communications to said communicators through said output device, the step of focusing on said selected words, said comparative words and said selected phrases by said artificially intelligent system of said operating system, the step of automatically triggering statements of intervention based upon said selected words, comparative words and phrases to ensure that all threads of said consensus building are fully considered, the step of automatically communicating said statements of intervention to said communicators of said consensus building process based upon certain of said obstacles in said consensus building process, the step a permitting said individual communicators to add said methodologies to said database, the step of allowing an individual communicator of said plurality of communicators conversing in said team proceedings to log off said networked complex through said at least one user interface upon completion of communications by said individual communicator and the final step of repeating said next through said final steps throughout said team proceedings until a last one of said individual communicators logs off said networked complex.

18. A method as in claim 17 wherein said interfaces are selected from the group comprising hard wired telephones, voice over interne technology, wireless devices, video devices, written text input devices including electronic tablets, microphones or combinations of the above.

19. The method as in claim 17 wherein said output device is selected from the group comprising hard wired telephones, wireless devices, video devices, written text output devices, audio speakers or combinations of the above.

20. A method as in claim 17 wherein said user interface accepts input from multiple, simultaneous users.

* * * * *